United States Patent
Hashizume

[11] Patent Number: 6,089,718
[45] Date of Patent: Jul. 18, 2000

[54] PROJECTION DISPLAY DEVICE

[75] Inventor: Toshiaki Hashizume, Suwa, Japan

[73] Assignee: Seiko Epson Corporation, Tokyo, Japan

[21] Appl. No.: 09/091,347

[22] PCT Filed: Oct. 30, 1997

[86] PCT No.: PCT/JP97/03981

§ 371 Date: Jul. 15, 1998

§ 102(e) Date: Jul. 15, 1998

[30] Foreign Application Priority Data

Oct. 30, 1996 [JP] Japan .................................. 8-305735

[51] Int. Cl.[7] .................................................. G03B 21/14
[52] U.S. Cl. .................................. 353/31; 353/20; 349/9
[58] Field of Search .......................... 353/20, 31, 33, 353/34, 37, 7; 349/8, 9

[56] References Cited

U.S. PATENT DOCUMENTS

| | | | |
|---|---|---|---|
| 5,374,968 | 12/1994 | Haven et al. | 353/31 |
| 5,541,673 | 7/1996 | Shioya et al. | 353/20 |
| 5,575,548 | 11/1996 | Lee | 353/31 |
| 5,605,390 | 2/1997 | Brice et al. | 353/34 |
| 5,626,408 | 5/1997 | Heynderickx et al. | 353/20 |
| 5,777,789 | 7/1998 | Chiu et al. | 353/34 |
| 5,829,852 | 11/1998 | Jung | 353/31 |
| 5,844,637 | 12/1998 | Katsumata | 349/8 |

FOREIGN PATENT DOCUMENTS

| | | |
|---|---|---|
| 64-11289 | 1/1989 | Japan . |
| 1-302385 | 12/1989 | Japan . |
| 2-287586 | 11/1990 | Japan . |
| 3-41434 | 3/1991 | Japan . |
| 4-138445 | 5/1992 | Japan . |
| 5-2149 | 1/1993 | Japan . |
| 5-66366 | 3/1993 | Japan . |
| 5-210097 | 8/1993 | Japan . |
| 6-202066 | 7/1994 | Japan . |
| 6-331983 | 12/1994 | Japan . |
| 7-87529 | 3/1995 | Japan . |
| 8-248353 | 9/1996 | Japan . |
| 9-159983 | 6/1997 | Japan . |

*Primary Examiner*—William Dowling
*Attorney, Agent, or Firm*—Oliff & Berridge, PLC

[57] ABSTRACT

All light polarized in random directions is converted into s-polarized light and emitted by a polarizing conversion element 140. Linearly polarized light to be modulated is made incident on three liquid crystal light valves 250, 252, and 254, and p-polarized green light and s-polarized red and blue light are made incident on a cross-dichroic prism 260. Accordingly, for example, $\lambda/2$ phase plates 310 and 312 are respectively located in the optical paths before the first and third liquid crystal light valves 250 and 254. The $\lambda/2$ phase plates may be placed at various positions in the optical paths between dichroic mirrors 210 and 212 and the cross-dichroic prism 260.

23 Claims, 15 Drawing Sheets

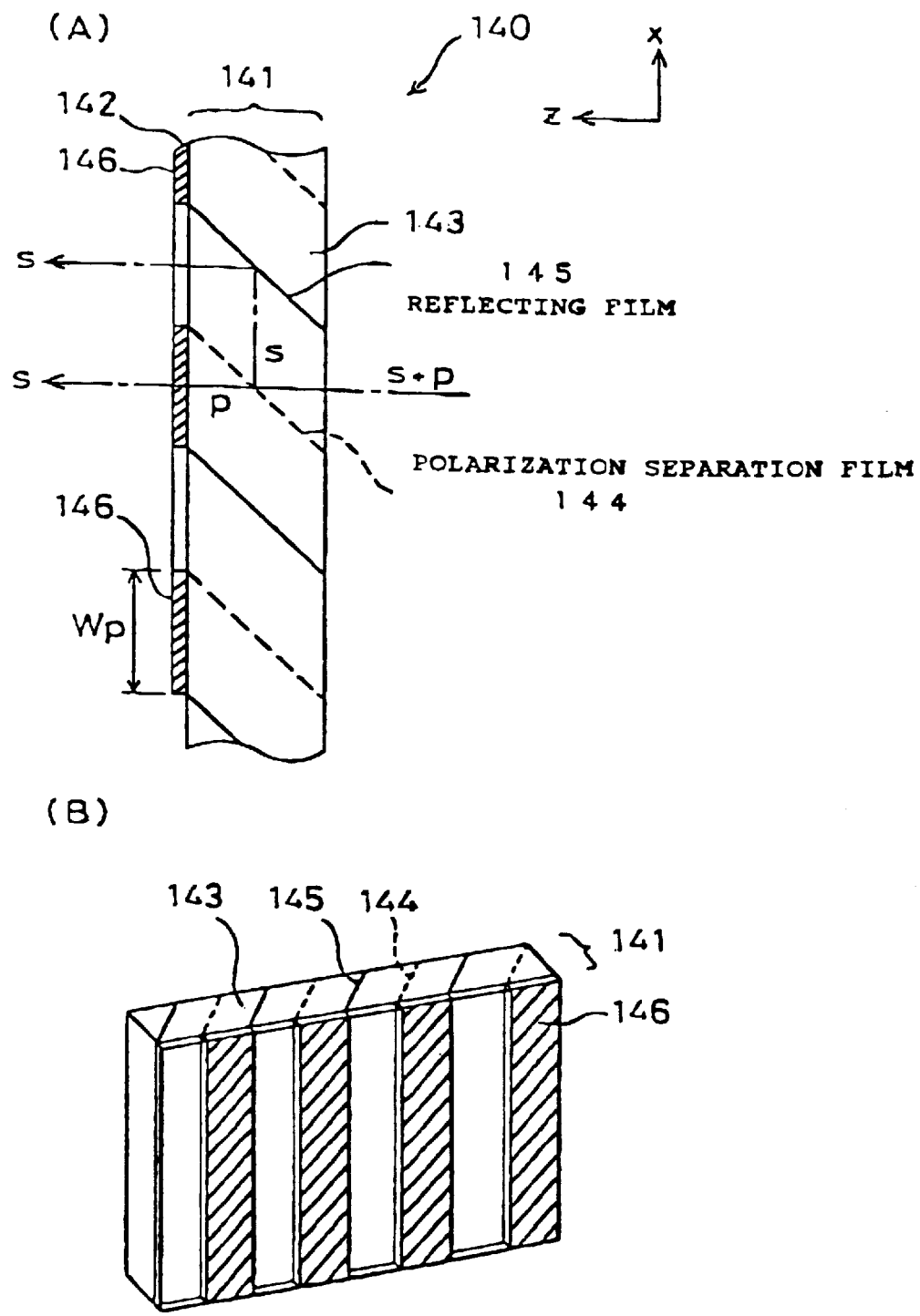

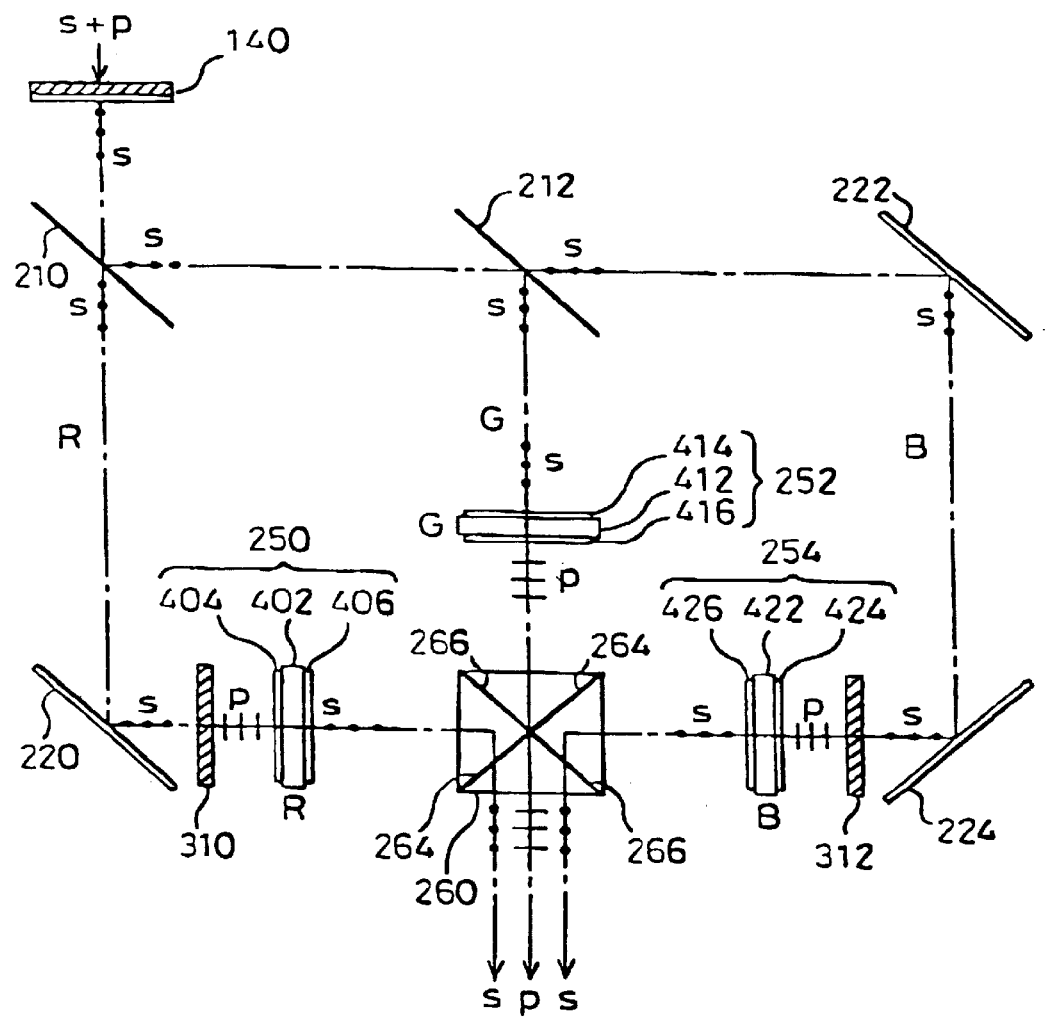

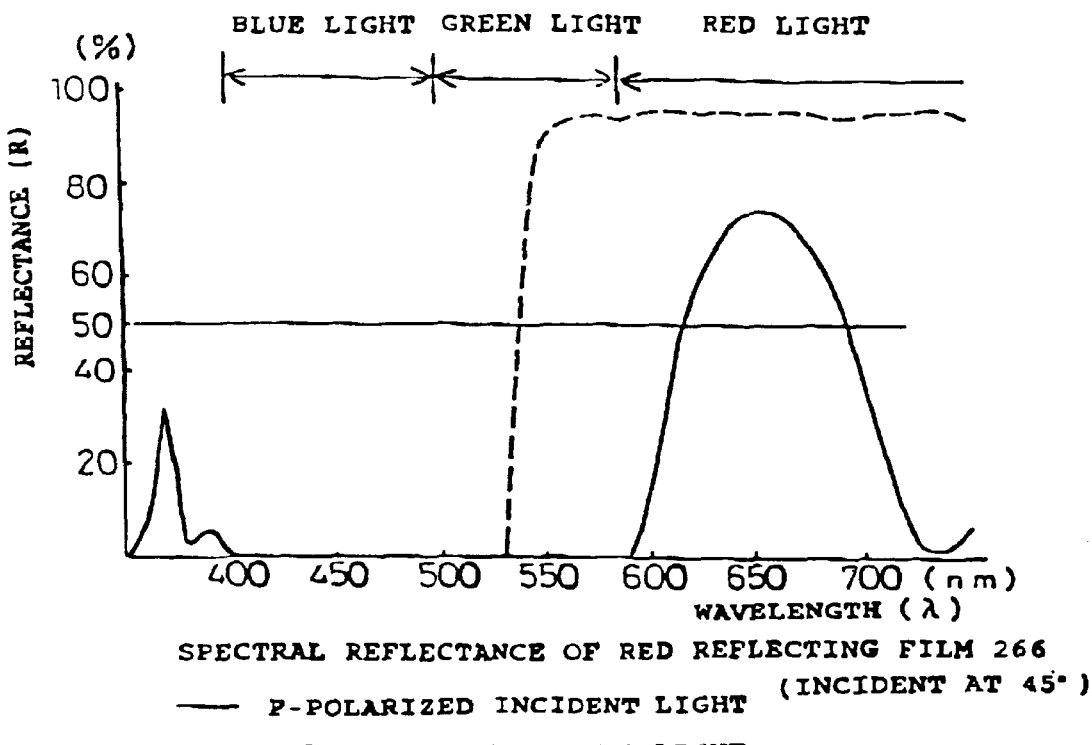
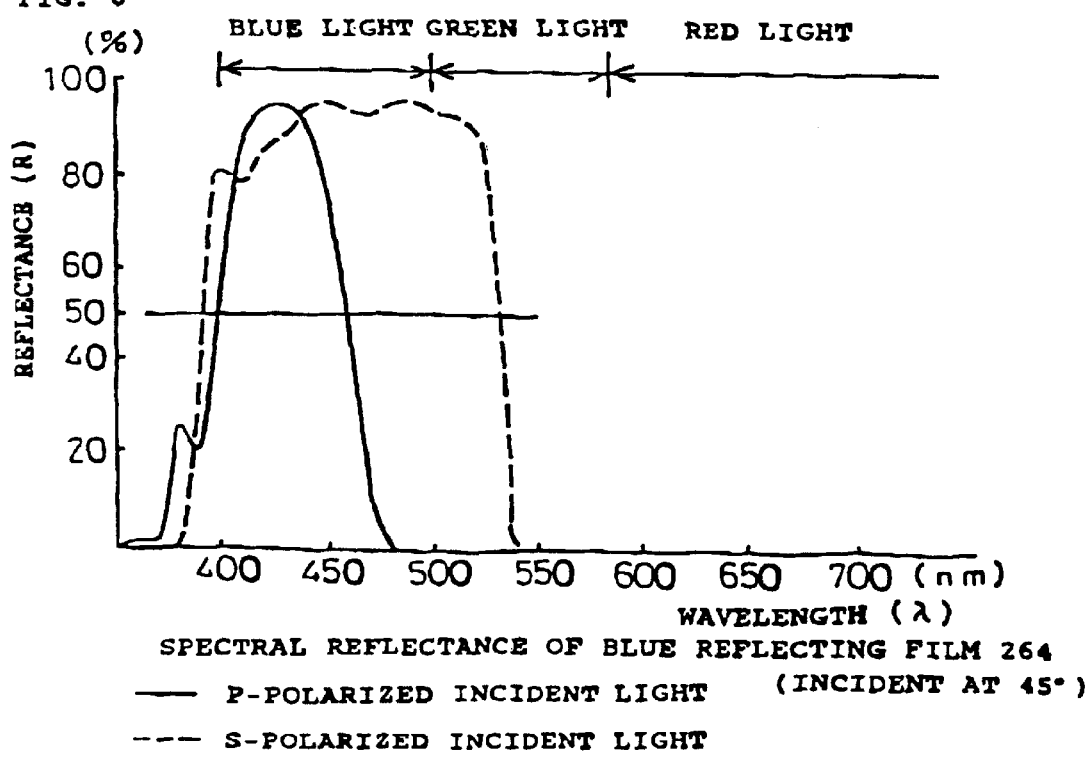

REFLECTED LIGHT

FOURTH EMBODIMENT

SPECTRAL REFLECTANCE OF GREEN REFLECTING FILM 267
(INCIDENT AT 45°)

—— P-POLARIZED INCIDENT LIGHT
--- S-POLARIZED INCIDENT LIGHT

SIXTH EMBODIMENT

PROJECTION DISPLAY DEVICE

BACKGROUND OF THE INVENTION

1. Field of Invention

The present invention relates to a projection display device provided with a light synthesizing means such as a cross-dichroic prism.

2. Description of Related Art

A cross-dichroic prism is sometimes employed in a projection display device that projects a color image onto a projection screen. A cross-dichroic prism is an optical element that synthesizes light of three colors, red, green, and blue, and emits the light in the same direction. Such a projection display device is disclosed in, for example, Japanese Unexamined Patent Publication No. 1-302385.

FIG. 16 is a conceptual view showing the principal parts of a projection display device. This projection display device includes three liquid crystal light valves 42, 44, and 46, a cross-dichroic prism 48, and a projection lens system 50. The liquid crystal light valves 42, 44, and 46 are each composed of a liquid crystal panel sandwiched between two polarizers placed so that the polarization axes thereof intersect at right angles. The cross-dichroic prism 48 synthesizes light of three colors, red, green, and blue, modulated by the three liquid crystal light valves 42, 44, and 46, and emits the synthesized light toward the projection lens system 50. The projection lens system 50 focuses the synthesized light onto a projection screen 52.

As shown in FIG. 16, a red reflecting film 61 and a blue reflecting film 62 are located in the form of an X in the cross-dichroic prism 48. The red reflecting film 61 and the blue reflecting film 62 each may be formed as a dielectric multilayer film that has a high reflectance for s-polarized light with a wider range of wavelengths than for p-polarized light. In the above projection display device disclosed in Japanese Unexamined Patent Publication No. 1-302385, such a red reflecting film 61 and a blue reflecting film 62 are used, and the red and blue light of the light of three colors, which is incident on the cross-dichroic prism 48, is made incident as s-polarized light and the green light is made incident as p-polarized light, which improves the reflection characteristic of the cross-dichroic prism 48. Specifically, when red light and blue light polarized in random directions are caused to enter the liquid crystal light valves for red and blue light 42 and 46, respectively, s-polarized red and blue light are emitted therefrom and caused to enter the cross-dichroic prism 48. Here, the general property of the liquid crystal light valve is employed, it being that only predetermined linearly polarized light is emitted. On the other hand, when green light polarized in random directions is caused to enter the liquid crystal light valve for green light 44, p-polarized green light is emitted therefrom and caused to enter the cross-dichroic prism 48.

Since light polarized in random directions is incident on three liquid crystal light valves in the above-mentioned conventional projection display device, components polarized in the direction orthogonal to the direction of the polarized components to be transmitted are absorbed by the liquid crystal light valves 42, 44, and 46. As a result of such light absorption, heat is generated in the liquid crystal light valves 42, 44, and 46, affecting the liquid crystal light valves and adjacent optical elements. This also applies to light valves other than such liquid crystal light valves.

Moreover, this also applies to a case in which the cross-dichroic prism 48 is replaced by a cross-dichroic mirror composed of two dichroic mirrors, both of which include the red reflecting film 61 and the blue reflecting film 62, located so that they cross in about the form of an X.

SUMMARY OF THE INVENTION

The present invention has been made to solve the above problem of the prior art, and has as an object the provision of a projection liquid crystal display device in which the amount of heat generated near light valves is reduced, and in which the reflection characteristic of a cross-dichroic prism or a cross-dichroic mirror is improved.

In order to solve at least part of the above problem, a projection display device according to a first embodiment includes a light source, a polarizing conversion element for converting incident light from the light source into linearly polarized light polarized in a first direction, colored-light separation means for separating the light emitted from the polarizing conversion element into light of three colors, a first light valve for receiving the light of a first color separated by the colored-light separation means and modulating the light based on a first image signal, a second light valve for receiving the light of a second color separated by the colored-light separation means and modulating the light based on a second image signal, a third light valve for receiving the light of a third color separated by the colored-light separation means and modulating the light based on a third image signal, a color synthesizing optical element, having a first reflecting film for reflecting the light of a first color and a second reflecting film for reflecting the light of a third color crossed in substantially the form of an X, for synthesizing the light of three colors modulated by the first to third light valves and emitting the synthesized light in the same direction, a projection lens system for projecting the light synthesized by the color synthesizing optical element, a first phase plate, located in the optical path between the polarizing conversion element and the first light valve, for converting the light of a first color polarized in the first polarization direction into linearly polarized light polarized in a second polarization direction and causing the converted light to enter the first light valve, and a second phase plate, located in the optical path between the polarizing conversion element and the third light valve, for converting the light of a third color polarized in the first polarization direction into linearly polarized light polarized in the second polarization direction and causing the converted light to enter the third light valve, wherein the second light valve receives the linearly polarized light polarized in the first polarization direction as incident light, modulates the incident light based on the second image signal, and thereby emits the incident light as linearly polarized light polarized in the second polarization direction, and wherein the first and third light valves receive the linearly polarized light polarized in the second polarization direction as incident light, modulate the incident light based on the first and third image signals, respectively, and thereby emit the incident light as linearly polarized light polarized in the first direction.

A projection display device according to a second embodiment includes a light source, a polarizing conversion element for converting incident light from the light source into linearly polarized light polarized in a first direction, colored-light separation means for separating the light emitted from the polarizing conversion element into light of three colors, a first light valve for receiving the light of a first color separated by the colored-light separation means and modulating the light based on a first image signal, a second light valve for receiving the light of a second color separated by the colored-light separation means and modulating the light based on a second image signal, a third light valve for receiving the light of a third color separated by the colored-light separation means and modulating the light based on a third image signal, a color synthesizing optical element, having a first reflecting film for reflecting the light of a first color and a second reflecting film for reflecting the light of a third color crossed in substantially the form of an X, for synthesizing the light of three colors modulated by the first to third light valves and emitting the synthesized light in the same direction, and a projection optical system for projecting the light synthesized by the color synthesizing optical element, wherein the first to third light valves receive linearly polarized light polarized in the first polarization direction as incident light, modulate the incident light based on the first to third image signals, respectively, and thereby emit the light as linearly polarized light polarized in the second polarization direction, wherein a first phase plate for converting the linearly polarized light emitted from the first light valve and polarized in the second polarization direction into linearly polarized light polarized in the first polarization direction and causing the converted light to enter the cross-dichroic prism is located in the optical path between the first light valve and the cross-dichroic prism, and wherein a second phase plate for converting the linearly polarized light emitted from the third light valve and polarized in the second polarization direction into linearly polarized light polarized in the first polarization direction and causing the converted light to enter the cross-dichroic prism is located in the optical path between the third light valve and the cross-dichroic prism.

A projection display device according to a third embodiment includes a light source, a polarizing conversion element for converting incident light from the light source into linearly polarized light polarized in a second direction, colored-light separation means for separating the light emitted from the polarizing conversion element into light of three colors, a first light valve for receiving the light of a first color separated by the colored-light separation means and modulating the light based on a first image signal, a second light valve for receiving the light of a second color separated by the colored-light separation means and modulating the light based on a second image signal, a third light valve for receiving the light of a third color separated by the colored-light separation means and modulating the light based on a third image signal, a color synthesizing optical element, having a first reflecting film for reflecting the light of a first color and a second reflecting film for reflecting the light of a third color crossed in substantially the form of an X, for synthesizing the light of three colors modulated by the first to third light valves and emitting the synthesized light in the same direction, a projection optical system for projecting the light synthesized by the color synthesizing optical element, and a phase plate, located in the optical path between the polarizing conversion element and the second light valve, for converting the light of a third color polarized in the second polarization direction into linearly polarized light polarized in a first polarization direction and causing the converted light to enter the second light valve, wherein the second light valve receives the linearly polarized light polarized in the second polarization direction as incident light, modulates the incident light based on the second image signal, and thereby emits the incident light as linearly polarized light polarized in the first polarization direction, and wherein the first and third light valves receive the linearly polarized light polarized in the second polarization direction as incident light, modulate the incident light based on the first and third image signals, respectively, and thereby emit the incident light as linearly polarized light polarized in the first direction.

A projection display device according to a fourth embodiment includes a light source, a polarizing conversion element for converting incident light from the light source into linearly polarized light polarized in a second direction, colored-light separation means for separating the light emitted from the polarizing conversion element into light of three colors, a first light valve for receiving the light of a first color separated by the colored-light separation means and modulating the light based on a first image signal, a second light valve for receiving the light of a second color separated by the colored-light separation means and modulating the light based on a second image signal, a third light valve for receiving the light of a third color light separated by the colored-light separation means and modulating the light based on a third image signal, a color synthesizing optical element, having a first reflecting film for reflecting the light of a first color and a second reflecting film for reflecting the light of a third color crossed in about the form of an X, for synthesizing the light of three colors modulated by the first to third light valves and emitting the synthesized light in the same direction, and a projection optical system for projecting the light synthesized by the color synthesizing optical element, wherein the first to third light valves receive the linearly polarized light polarized in the second polarization direction as incident light, modulate the incident light based on the first to third image signals, respectively, and thereby emit the incident light as linearly polarized light polarized in a first direction, and wherein a phase plate for converting the light of a second color polarized in the first polarization direction into linearly polarized light polarized in the second polarization direction and causing the converted light to enter the cross-dichroic prism is located in the optical path between the second light valve and the color synthesizing optical element.

A projection display device according to a fifth embodiment includes a light source, a polarizing conversion element for converting incident light from the light source into linearly polarized light polarized in a first direction, colored-light separation means for separating the light emitted from the polarizing conversion element into light of three colors, a first light valve for receiving the light of a first color separated by the colored-light separation means and modulating the light based on a first image signal, a second light valve for receiving the light of a second color separated by the colored-light separation means and modulating the light based on a second image signal, a third light valve for receiving the light of a third color separated by the colored-light separation means and modulating the light based on a third image signal, a color synthesizing optical element, having a first reflecting film for reflecting the light of a first color and a second reflecting film for reflecting the light of a third color crossed in substantially the form of an X, for synthesizing the light of three colors modulated by the first to third light valves and emitting the synthesized light in the same direction, a projection optical system for projecting the light synthesized by the color synthesizing optical element, and first phase plates, located in the optical paths between the polarizing conversion element and the first to third light valves, for converting the light of first to third colors polarized in the first polarization direction into linearly polarized light polarized in a second polarization direction and causing the converted light to enter the first light valve, wherein the first to third light valves receive the linearly polarized light polarized in the second polarization direction as incident light, modulate the incident light based on the first to third image signals, respectively, and thereby emit the incident light as linearly polarized light polarized in the first direction, and wherein a second phase plate for emitting the linearly polarized light polarized in the first polarization direction as linearly polarized light polarized in the second polarization direction is located between the second optical modulating means and the color synthesizing optical element.

In the above first to fifth embodiments, since the polarizing conversion element converts light from the light source into predetermined polarized light, light absorption hardly occurs therein, and little heat is generated owing to light absorption. Light of three colors separated by the colored-light separation means is polarized in the same direction as the predetermined polarized light. Linearly polarized light to be modulated enters the light valves. Therefore, light absorption hardly occurs in the light valves, and little heat is generated owing to light absorption. Furthermore, the light that is incident from the first and third light valves on the color synthesizing optical element is linearly polarized light polarized in the first polarization direction, and the light that is incident from the second light valve on the color synthesizing optical element is light polarized in the second polarization direction. Accordingly, the light of three colors is efficiently emitted from the color synthesizing optical element to the projection optical system. Therefore, heat generation is hardly caused by absorption of the light that returns from the color synthesizing optical element to the light valve.

It is preferable that the above first to fifth embodiments each further include a phase plate, located in the optical path on the emitting side of the color synthesizing optical element, for converting the light of three colors emitted from the color synthesizing optical element into polarized light each contain a linearly polarized component polarized in the first polarization direction and a linearly polarized component polarized in the second polarization direction.

This allows the colored light polarized in the first polarization direction and the colored light polarized in the second polarization direction, which are emitted from the color synthesizing optical element, to be converted so that they each contain the first and second linearly polarized components, and therefore, a color image can be projected onto a screen that reflects only a polarized component polarized in one direction, such as a polarizing screen. As this phase plate, a λ/2 phase plate may be used. The use of the λ/2 phase plate makes it possible to obtain linearly polarized light containing two linearly polarized components. At this time, it is most preferable to convert into linearly polarized light containing linearly polarized components polarized in the first and second polarization directions in almost equal proportions. Furthermore, a λ/4 phase plate may be used as the phase plate. When the λ/4 phase plate is used, it is possible to obtain elliptically polarized light in which two linearly polarized components are synthesized. Circularly polarized light is the most preferable one of the elliptically polarized light.

In addition to the first to fifth embodiments, a projection display device according to a sixth embodiment includes a light source, colored-light separation means for separating light emitted from the light source into light of three colors, a first light valve for receiving the light of a first color separated by the colored-light separation means, modulating the light based on a first image signal and emitting the light as predetermined linearly polarized light, a second light valve for receiving the light of a second color separated by the colored-light separation means, modulating the light based on a second image signal and emitting the light as predetermined linearly polarized light, a third light valve for receiving the light of a third color separated by the colored-light separation means, modulating the light based on a third image signal and emitting the light as predetermined polarized light, a color synthesizing optical element, having a first reflecting film for reflecting the light of a first color and a second reflecting film for reflecting the light of a third color crossed in substantially the form of an X, for synthesizing the light of three colors modulated by the first to third light valves and emitting the synthesized light in the same direction, a projection optical system for projecting the light synthesized by the color synthesizing optical element, and two phase plates, located in the optical path between at least one of the light valves and the color synthesizing optical element, for giving equal phase differences, wherein one of the two phase plates that is located on the side of the color synthesizing optical element is adhered to the incident surface of the color synthesizing optical element, and wherein the optical axes of the two phase plates are set so that the polarization direction of the light incident on the phase plate located on the side of the light valve and the polarization direction of the light emitted from the phase plate located on the side of the color synthesizing optical element are identical to each other.

According to the sixth embodiment, when light incident from the light valve on the projection optical system is reflected by the projection optical system and returns again to the light valve, the polarization direction of the light is turned through an angle of 90° by the two λ/4 phase plates. Since the light is absorbed by a polarizer provided on the surface of the light valve, a malfunction of the light valve can be prevented.

BRIEF DESCRIPTION OF THE DRAWINGS

FIGS. 3(A) and 3(B) are explanatory views showing the structure of a polarizing conversion element 140.

FIG. 4 is a conceptual view showing the principal parts of the first embodiment.

FIG. 5 is a graph showing the spectral reflectance characteristics of a red reflecting film.

FIG. 6 is a graph showing the spectral reflectance characteristics of a blue reflecting film.

DETAILED DESCRIPTION OF PREFERRED EMBODIMENTS

A. FIRST EMBODIMENT

Figure 1:
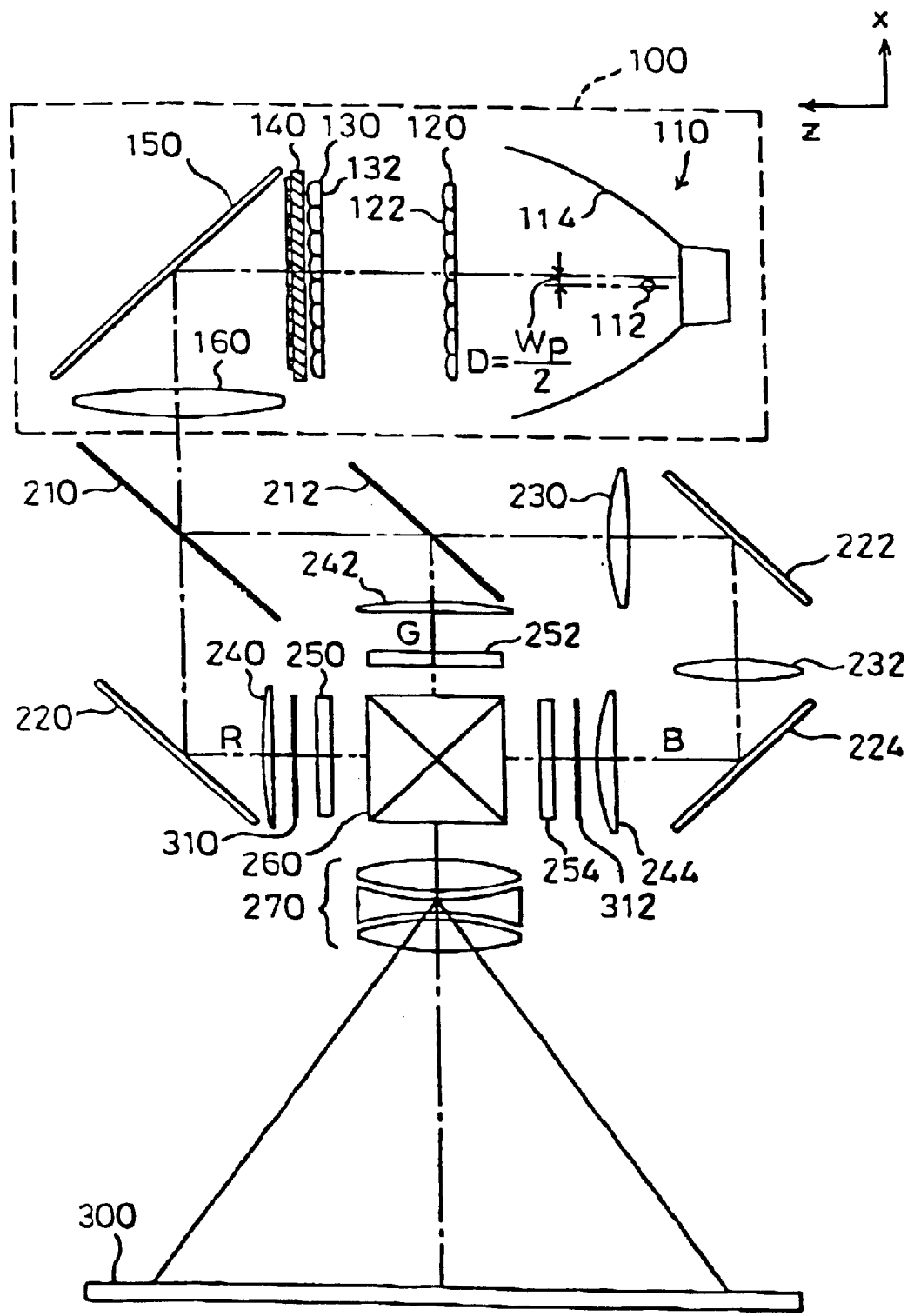
FIG. 1 is a schematic plan view of a projection display device according to a first embodiment of the present invention.

Next, modes for carrying out the present invention will be described with reference to embodiments. FIG. 1 is a schematic plan view of a projection display device according to a first embodiment of the present invention. This projection display device includes an illumination optical system 100, dichroic mirrors 210 and 212, reflecting mirrors 220, 222, and 224, relay lenses 230 and 232, three field lenses 240, 242, and 244, two λ/2 phase plates 310 and 312, three liquid crystal light valves 250, 252, and 254, a cross-dichroic prism 260, and a projection lens system 270.

The illumination optical system 100 includes a light source 110 for emitting an almost parallel light beam, a first lens array 120, a second lens array 130, a polarizing conversion element 140 for converting incident light into a predetermined linearly polarized component, a reflecting mirror 150, and a condenser lens 160. The illumination optical system 100 is an optical system that almost uniformly illuminates the three liquid crystal light valves 250, 252, and 254 serving as regions to be illuminated.

The light source 110 includes a light source lamp 112 serving as a radiation light source for emitting radial beams, and a concave mirror 114 for emitting the radial beams emitted from the source lamp 112 as an almost parallel bundle of beams. It is preferable that a parabolic mirror be adopted as the concave mirror 114.

Figure 2:
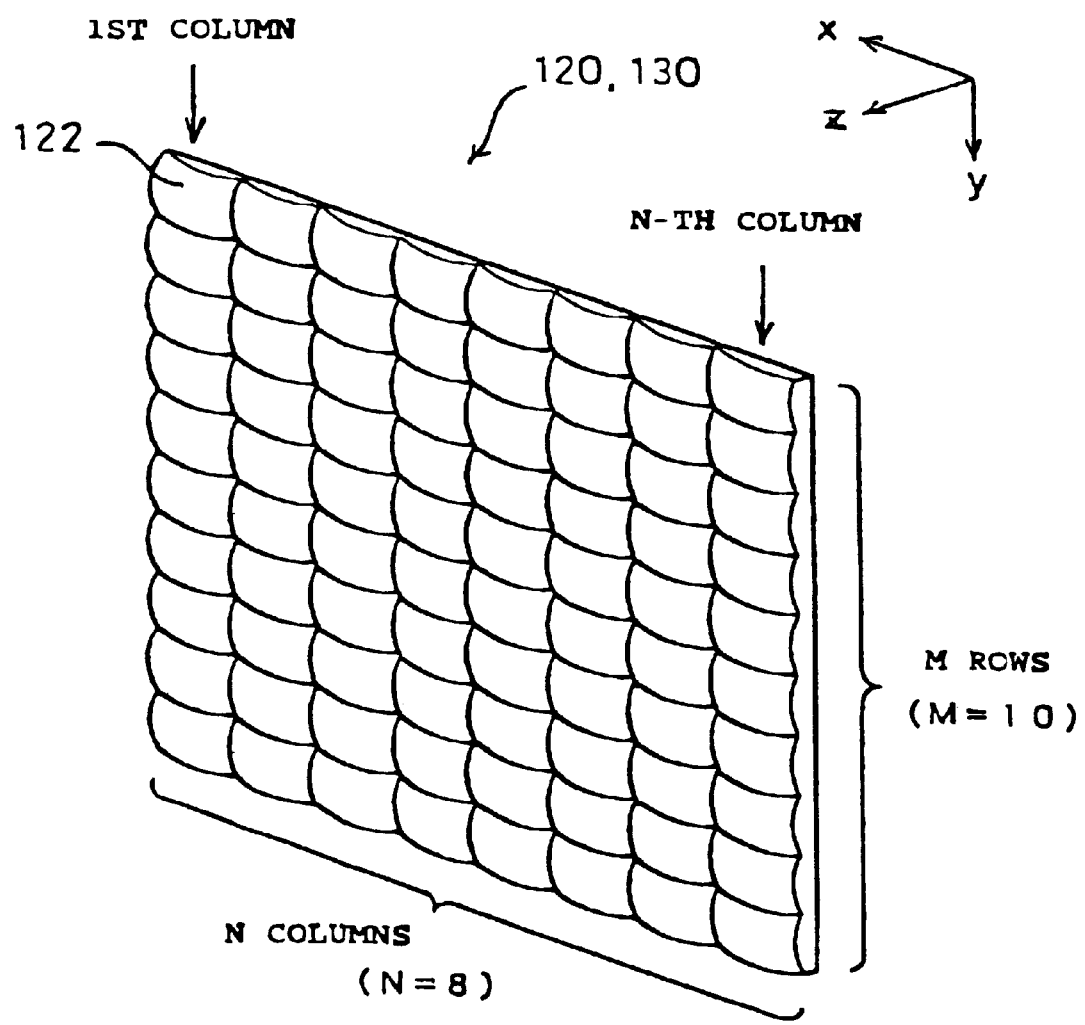
FIG. 2 is a perspective view showing the outward appearance of a first lens array 120.

FIG. 2 is a perspective view showing the outward appearance of the lens arrays 120 and 130. The first lens array 120 is composed of small lenses 122, each having an almost rectangular outline, arranged in a matrix with M rows and N columns. In this embodiment, M is 10 and N is 8. The second lens array 130 is also composed of a M by N matrix of small lenses, corresponding to the small lenses 122 of the first lens array 120. Each of the small lenses 122 splits a parallel beam incident from the light source 110 (FIG. 1) into a plurality of (that is, M by N) partial beams, and focuses each of the partial beams near the second lens array 130. The outer shape of the small lenses 122 viewed from the z direction is set almost similar to the shape of the liquid crystal light valves 250, 252, and 254. In this embodiment, the aspect ratio (the length-to-width ratio) of the small lenses 122 is set at 4:3.

FIG. 3 is an explanatory view showing the structure of the polarizing conversion element 140 (FIG. 1). The polarizing conversion element 140 includes a polarizing beam splitter array 141, and a selective phase plate 142. The polarizing beam splitter array 141 is shaped so that a plurality of translucent prismatic members 143 of parallelogram-shaped cross section are alternately adhered. At the interfaces among the translucent members 143, polarization separating films 144 and reflecting films 145 are alternately formed. The polarizing beam splitter array 141 is made by adhering a plurality of glass plates, which are provided with the polarization separating films 144 and the reflecting films 145, so that the polarization separating films 144 and the reflecting films 145 are alternately arranged, and cutting the glass plates diagonally at a given angle. The polarizing conversion element 140 enhances the light use efficiency of the projection display device by converting all light from the light source 110, which is polarized in random directions, into s-polarized light. Moreover, since little light is absorbed in the polarizing conversion element 140, the amount of heat generated owing to light absorption is small.

Light passed through the first and second lens arrays 120 and 130 is separated into s-polarized light and p-polarized light by the polarization separating film 144. The s-polarized light is reflected almost perpendicularly by the polarization separating film 144, further reflected perpendicularly by the reflecting film 145, and then emitted. On the other hand, the p-polarized light passes without change through the polarization separating film 144. The selective phase plate 142 includes λ/2 phase layers 146 each formed corresponding to the position where the light passing through the polarization separating film 144 is emitted, and colorless transparent optical elements each formed corresponding to the position where the light reflected from the reflecting film 145 is emitted. Therefore, the p-polarized light passing through the polarization separating film 144 is converted into s-polarized light and emitted by the λ/2 phase layers 146. As a result, light beams incident on the polarizing conversion element 140, which are polarized in random directions, are all converted into s-polarized beams and emitted. If the positions of the λ/2 phase layers 146 are shifted to the emitting sides of the reflecting films 145, all emitting beams can be converted into p-polarized beams.

As shown in FIG. 3(A), the centers of two s-polarized beams emitted from the polarizing conversion element 140 (the middles of the two s-polarized beams) are offset from the center of the incident random light beam (s-polarized light+p-polarized light) in the x direction. The amount of offset is equal to a width Wp of the λ/2 phase layers 146 (that is, the width of the polarization separating film 144 in the x direction). Accordingly, as shown in FIG. 1, the optical axis of the light source 110 (shown by a two-dot chained line) is set at a position offset from the system optical axis (shown by a one-dot chained line) from the polarizing conversion element 140 on by a distance D that is equal to Wp/2.

In the projection display device shown in FIG. 1, a parallel beam emitted from the light source 110 is split into a plurality of partial beams by the first and second lens arrays 120 and 130. The small lenses 122 of the first lens array 120 focus the partial beams near the polarization separating films 144 of the polarizing conversion element 140 (FIG. 3). Small lenses 132 of the second lens array 130 have the function of focusing the light source images formed by the first lens array 120 onto the liquid crystal light valves 250, 252, and 254. The partial beams emitted from the small lenses 132 of the second lens array 130 are reflected by the reflecting mirror 150, and made incident on the condenser lens 160. The condenser lens 160 functions as a superimposition optical system for superimposing and gathering these plurality of partial beams onto the liquid crystal light valves 250, 252, and 254 serving as regions to be illuminated. As a result, the liquid crystal light valves 250, 252, and 254 are illuminated almost uniformly.

The two dichroic mirrors 210 and 212 each function as a colored-light separation means for separating white light gathered by the condenser lens 160 into light of three colors, red, green, and blue. The first dichroic mirror 210 transmits a red light component of the white light beam emitted from the illumination optical system 100, and reflects blue and green light components. The red light passing through the first dichroic mirror 210 is reflected by the reflecting mirror 220, passes through the field lens 240 and the λ/2 phase plate 310, and reaches the liquid crystal light valve for red light

250. This field lens 240 has the function of focusing the light source image near the second lens array 130 into the projection lens system 270. The partial beams passing through the field lens 240 are converted into almost parallel beams. This also applies to the field lenses 242 and 244 located before the other liquid crystal light valves.

The λ/2 phase plates 310 and 312 respectively serve to turn the directions of polarization of the red light and the blue light through an angle of 90° and to cause the light to enter the liquid crystal light valve 250.

The green light of the blue and green light reflected by the first dichroic mirror 210 is reflected by the second dichroic mirror 212, passes through the field lens 242, and reaches the liquid crystal light valve for green light 252. On the other hand, the blue light passes through the second dichroic mirror 212, a relay lens system including the relay lenses 230 and 232 and the reflecting mirrors 222 and 224, the field lens 244, and the λ/2 phase plate 312, and reaches the liquid crystal light valve for blue light 254.

The three liquid crystal light valves 250, 252, and 254 respectively serve to modulate the light of three colors for image formation according to given image information (image signals). The cross-dichroic prism 260 functions as a color synthesizing optical element for forming a color image by synthesizing the light of three colors. The synthesized light produced by the cross-dichroic prism 260 is emitted toward the projection lens system 270. The projection lens system 270 functions as a projection optical system for projecting the synthesized light onto the projection screen 300 and displaying the color image thereon.

FIG. 4 is a conceptual view showing the principal parts of the first embodiment. In FIG. 4, the optical system between the polarizing conversion element 140 and the cross-dichroic prism 260 is shown with attention to the direction of polarization. The optical elements (lenses and the like) that are almost unrelated to the direction of polarization are not shown.

In the first embodiment, randomly polarized light enters the polarizing conversion element 140, and only s-polarized light is emitted therefrom. The s-polarized white light is separated into red light R, green light G, and blue light B by the two dichroic mirrors 210 and 212, as mentioned above. The light of three colors remains s-polarized because it does not change the direction of polarization when passing through the dichroic mirrors 210 and 212. In this embodiment, the s-polarized light corresponds to linearly polarized light having a first polarization direction in the present invention, and the p-polarized light corresponds to linearly polarized light having a second polarization direction.

The s-polarized red light is converted into p-polarized light by the λ/2 phase plate 310 after being reflected by the reflecting mirror 220. The p-polarized red light enters the first liquid crystal light valve 250. The first liquid crystal light valve 250 includes a liquid crystal panel 402, a polarizer 404 located on the incident side of the liquid crystal panel 402 to transmit p-polarized light, and a polarizer 406 located on the emitting side to transmit s-polarized light. The p-polarized red light that is incident on the first liquid crystal light valve 250 passes through the p-polarizing light transmissive polarizer 404 without change, and is modulated by the liquid crystal panel 402, whereby it is partially converted into s-polarized light. Only the s-polarized light is transmitted through the s-polarizing light transmissive polarizer 406 and then emitted. Consequently, the red light emitted from the first liquid crystal light valve 250 is s-polarized light. In this way, since the red light that is incident on the first liquid crystal light valve 250 is previously adjusted to linearly polarized light to be modulated in the liquid crystal light valve 250 (that is, linearly polarized light to be transmitted through the incident-side polarizer 404), the light use efficiency is hardly lowered owing to light absorption and little heat is generated near the liquid crystal light valve 250.

The s-polarized green light separated by the second dichroic mirror 212 enters the second liquid crystal light valve 252 unchanged. The second liquid crystal light valve 252 includes a liquid crystal panel 412, a polarizer 414 located on the incident side of the liquid crystal panel 412 to transmit s-polarized light, and a polarizer 416 located on the emitting side to transmit p-polarized light. The s-polarized green light that is incident on the second liquid crystal light valve 252 passes through the s-polarizing light transmissive polarizer 414 without change, and is modulated by the liquid crystal panel 412, whereby it is partially converted into p-polarized light. Only the p-polarized light is transmitted through the p-polarizing light transmissive polarizer 416 and then emitted. Consequently, the green light emitted from the second liquid crystal light valve 252 is p-polarized light. In this way, since the green light that is incident on the second liquid crystal light valve 252 is previously adjusted to linearly polarized light to be modulated in the liquid crystal light valve 252 (that is, linearly polarized light to be transmitted through the incident-side polarizer 414), little light is absorbed and little heat is generated near the liquid crystal light valve 252.

The s-polarized blue light separated by the second dichroic mirror 212 is converted into p-polarized light by the λ/2 phase plate 312 after being reflected by the reflecting mirrors 222 and 224. The p-polarized blue light enters the third liquid crystal light valve 254. The third liquid crystal light valve 254 includes a liquid crystal panel 422, a polarizer 424 located on the incident side of the liquid crystal panel 422 to transmit p-polarized light, and a polarizer 426 located on the emitting side to transmit s-polarized light. This is the same as the first liquid crystal light valve 250. Therefore, only s-polarized light converted from the p-polarized blue light, which is incident on the third liquid crystal light valve 254, is emitted therefrom. In this way, since the blue light that is incident on the third liquid crystal light valve 254 is previously adjusted to linearly polarized light to be modulated in the liquid crystal light valve 254, little light is absorbed and little heat is generated near the liquid crystal light valve 254.

In the cross-dichroic prism 260, a blue reflecting film 264 and a red reflecting film 266 are located in substantially the form of an X. The s-polarized red light modulated by the first liquid crystal light valve 250 is reflected by the red reflecting film 266, and emitted toward the projection lens system 270 (FIG. 1). The s-polarized blue light modulated by the third liquid crystal light valve 254 is similarly reflected by the blue reflecting film 264 and emitted toward the projection lens system 270. The p-polarized green light modulated by the second liquid crystal light valve 252 passes through the blue reflecting film 264 and the red reflecting film 266 without change and is emitted toward the projection lens system 270. In FIG. 4, the positions where the red light and the blue light are reflected are slightly offset from the reflecting films for convenience of illustration.

FIGS. 5 and 6 are graphs showing examples of spectral reflectance characteristics of the red reflecting film 266 and the blue reflecting film 264. In FIGS. 5 and 6, the reflectance characteristic with respect to s-polarized light is shown by a broken line, and the reflectance characteristic with respect to p-polarized light is shown by a solid line. In this description, the wavelength range that provides a reflectance of more than 50% is referred to as an "effective reflection wavelength range", and a wavelength that provides a reflectance of 50% is referred to as a "cutoff wavelength".

In general, the wavelength range of blue light is set from about 400 nm to about 500 nm, the wavelength range of green light is set from about 500 nm to about 580 nm, and the wavelength range of red light is set from about 580 nm to about 700 nm. As shown in FIG. 5, the effective reflection wavelength range (from about 530 nm to about 750 nm) of the red reflecting film 266 with respect to s-polarized light includes and is wider than the effective reflection wavelength range (about 600 nm to about 700 nm) with respect to p-polarized light. As mentioned with reference to FIG. 4, since the red light enters the cross-dichroic prism 260 as s-polarized light, it is almost 100% reflected by the red reflecting film 266 having the characteristic shown in FIG. 5. On the other hand, since the green light enters the dichroic prism 260 as p-polarized light, it is transmitted almost 100% through the red reflecting film 266 having the characteristic shown in FIG. 5.

On the other hand, as shown in FIG. 6, the effective reflection wavelength range (from about 390 nm to about 530 nm) of the blue reflecting film 264 with respect to s-polarized light includes and is wider than the effective reflection wavelength range (from about 400 nm to about 460 nm) with respect to p-polarized light. Since the blue light enters the dichroic prism 260 as s-polarized light, it is reflected by the blue reflecting film 264 having the characteristic shown in FIG. 6 at a considerably high reflectance of more than about 80%. On the other hand, since the green light enters the cross-dichroic prism 260 as p-polarized light, it is transmitted almost 100% through the blue reflecting film 264 having the characteristic shown in FIG. 6.

In this way, the red reflecting film 266 and the blue reflecting film 264 have the reflectance characteristics with respect to s-polarized light that are superior to those with respect to p-polarized light. Therefore, a high reflectance with respect to red light and blue light and a high transmittance with respect to green light can be obtained by causing the red light and the blue light to enter the dichroic prism 260 as s-polarized light and causing the green light to enter the dichroic prism 260 as p-polarized light. As a result, it is possible to enhance the use efficiency of the light of three colors.

In general, the reflectance characteristics of the red reflecting film 266 and the blue reflecting film 264 depend on the incident angle of light with respect to the cross-dichroic prism 260. Specifically, when the incident angle varies, the slope of the curve in the graph near the cutoff wavelength decreases. In the reflectance characteristic of the red reflecting film shown in FIG. 5, however, the green light that is incident as p-polarized light is transmitted almost 100%, the red light that is incident as s-polarized light is reflected almost 100%, and the reflectance characteristic has a wide margin. Therefore, even if the incident angle with respect to the cross-dichroic prism 260 changes to some extent, the reflectance with respect to red light and the transmittance with respect to green light hardly change. This also applies to the blue reflecting film 264. Since the reflectance characteristic is not influenced so much by the incident angle of incident light in this way, the light of three colors incident on the cross-dichroic prism 260 may take the form of light beams that slightly converge, instead of parallel beams. When converging beams are incident, the load on the projection lens system 270 can be decreased. That is, the number of lenses in the projection lens system 270 can be reduced, and there is no need to use high-performance expensive lenses.

The wavelength bands of red, blue, and green that are respectively incident on the liquid crystal light valves 250, 252, and 254, that is, the color shades of red, blue, and green are determined by the selective wavelength bands of the first and second dichroic mirrors 210 and 212 serving as color separation means. Consequently, only light with wavelengths in a predetermined band selected by the first or second dichroic mirrors 210 or 212 is incident on the red reflecting film 266 and the blue reflecting film 264 in the cross-dichroic prism 260. That is, there is no need to determine again the wavelength bands of red, blue, and green by the red reflecting film 266 and the blue reflecting film 264 in the dichroic prism 260. Therefore, even if the reflection bands of the red reflecting film 266 and the blue reflecting film 264 are set considerably wider than the predetermined wavelength band to be selected by the dichroic mirror 210, the shades of red, blue, and green do not change, and conveniently, the loss of light can be reduced.

If the reflection band of the red reflecting film 266 with respect to s-polarized light is set wider than the wavelength band (normally about 580 nm to 700 nm) to be selectively transmitted by the first dichroic mirror 210 as shown in FIG. 5, or if the reflection band of the blue reflecting film 264 with respect to s-polarized light is set wider than the wavelength band (normally about 400 nm to 500 nm) to be selectively transmitted by the second dichroic mirror 212 as shown in FIG. 6, the amount of green light to be transmitted, which is incident as p-polarized light, does not decrease. This is because most of the green light with wavelengths (normally about 500 nm to 580 nm) that is incident as p-polarized light is transmitted through the red reflecting film 266 and the blue reflecting film 264, as shown by the solid lines representing p-polarized incident light in the graphs of FIGS. 5 and 6.

Furthermore, the first embodiment has the advantage of being capable of preventing crosstalk of the three liquid crystal light valves 250, 252, and 254 because the polarization direction of red light and blue light and the polarization direction of green light are orthogonal to each other. Here, "crosstalk" means a phenomenon in which the liquid crystal light valve malfunctions owing to irradiation of the back thereof with reflected light from the cross-dichroic prism 260.

The principle on which crosstalk occurs will be now described in more detail with reference to, for example, a liquid crystal light valve having a liquid crystal panel using a polysilicon TFT (polysilicon TFT liquid crystal panel) as a pixel switching device, which is popularly adopted as the liquid crystal light valves 250, 252, and 254.

Figure 7:
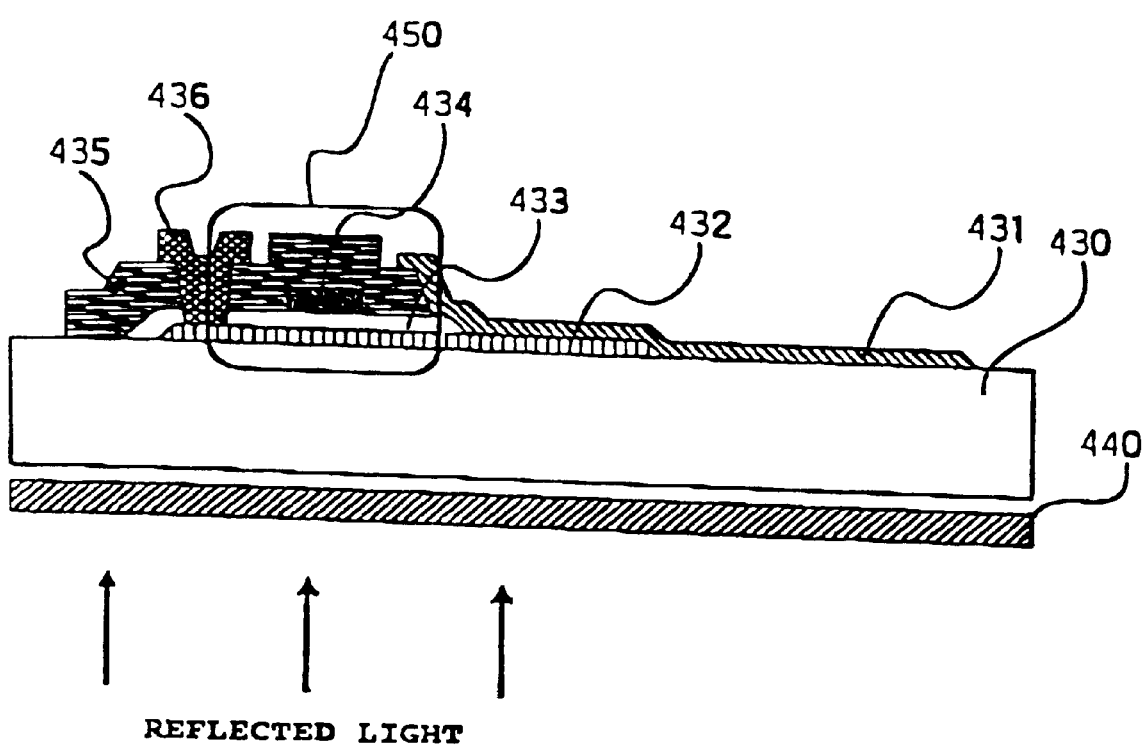
FIG. 7 is an explanatory view of a polysilicon TFT liquid crystal panel.

The liquid crystal panel has a structure in which liquid crystal is sandwiched between a pair of substrates. As is well known, in the polysilicon TFT liquid crystal panel, one of the two substrates is provided with a polysilicon TFT as a pixel switching device, and the other substrate is provided with a counter electrode. FIG. 7 is an explanatory view of an example of a polysilicon TFT liquid crystal panel, and it is also a partial cross-sectional view of one substrate 430 of two substrates in the polysilicon TFT liquid crystal panel, which is provided with a polysilicon TFT, and a polarizer 440 located outside of the polysilicon TFT panel. The polysilicon TFT 450 includes an active layer 432 of polysilicon that is formed on the substrate 430, and a gate 434 formed thereon with a gate insulating layer 433 between and made of polysilicon or the like. A source electrode 436 for supplying the polysilicon TFT 450 with ON and OFF signals is connected to the active layer 432 through a hole formed on the part of an interlayer insulating film 435. A pixel electrode 431 is also connected to the active layer 432. Information about image modulation is written by turning on the polysilicon TFT 450 and applying voltage to the liquid crystal sandwiched between the pixel electrode 431 and the counter electrode. After the completion of writing, the polysilicon TFT 450 is turned off in order that the written information may be held until the next information is written.

Since the polysilicon TFT liquid crystal panel is placed so that the substrate 430 with the polysilicon TFT 450 is located on the side of the cross-dichroic prism 260, however, it is irradiated with reflected light from the cross-dichroic prism 260 from the direction shown by the arrow in the figure. When this reflected light reaches the active layer 432, carriers are generated by optical excitation in the active layer 405, and current (what is called optical leakage current) is thereby generated even though the polysilicon TFT 450 is off. As a result, the voltage applied to the liquid crystal changes, which disturbs the condition of image modulation.

According to the configuration of this embodiment, however, it is possible to avoid such a problem. Assuming that green light is reflected by the red reflecting film 266 and irradiates the back of the third light valve 254 in FIG. 4, since the green light is p-polarized light in this case, it is shielded by the s-polarizing light transmissive polarizer 426 located on the emitting side of the third liquid crystal light valve 254 and does not reach the liquid crystal panel 422. Therefore, crosstalk is prevented from being caused by green light in the third liquid crystal light valve 254. Similarly, crosstalk is prevented from being caused by green light in the first liquid crystal light valve 250, and crosstalk is also prevented from being caused by blue light in the second liquid crystal light valve 252. Such crosstalk is similarly prevented between the second liquid crystal light valve 252 and the third liquid crystal light valve 254.

Red light passing through the first liquid crystal light valve 250 hardly reaches the third liquid crystal light valve 254. This is because the reflection band of the red reflecting film 266 can be set considerably wider than the band determined by the first dichroic mirror 210 and almost all red light can be reflected by the red reflecting film 266. This also applies to blue light. In this way, according to this embodiment, it is possible to solve the problem of crosstalk resulting from the light passing through the red reflecting film 266 and the blue reflecting film 264.

As mentioned above, the first embodiment is advantageous in that the light use efficiency is high over the entire projection display device and that the amount of heat resulting from light absorption is small.

B. SECOND EMBODIMENT

Figure 8:
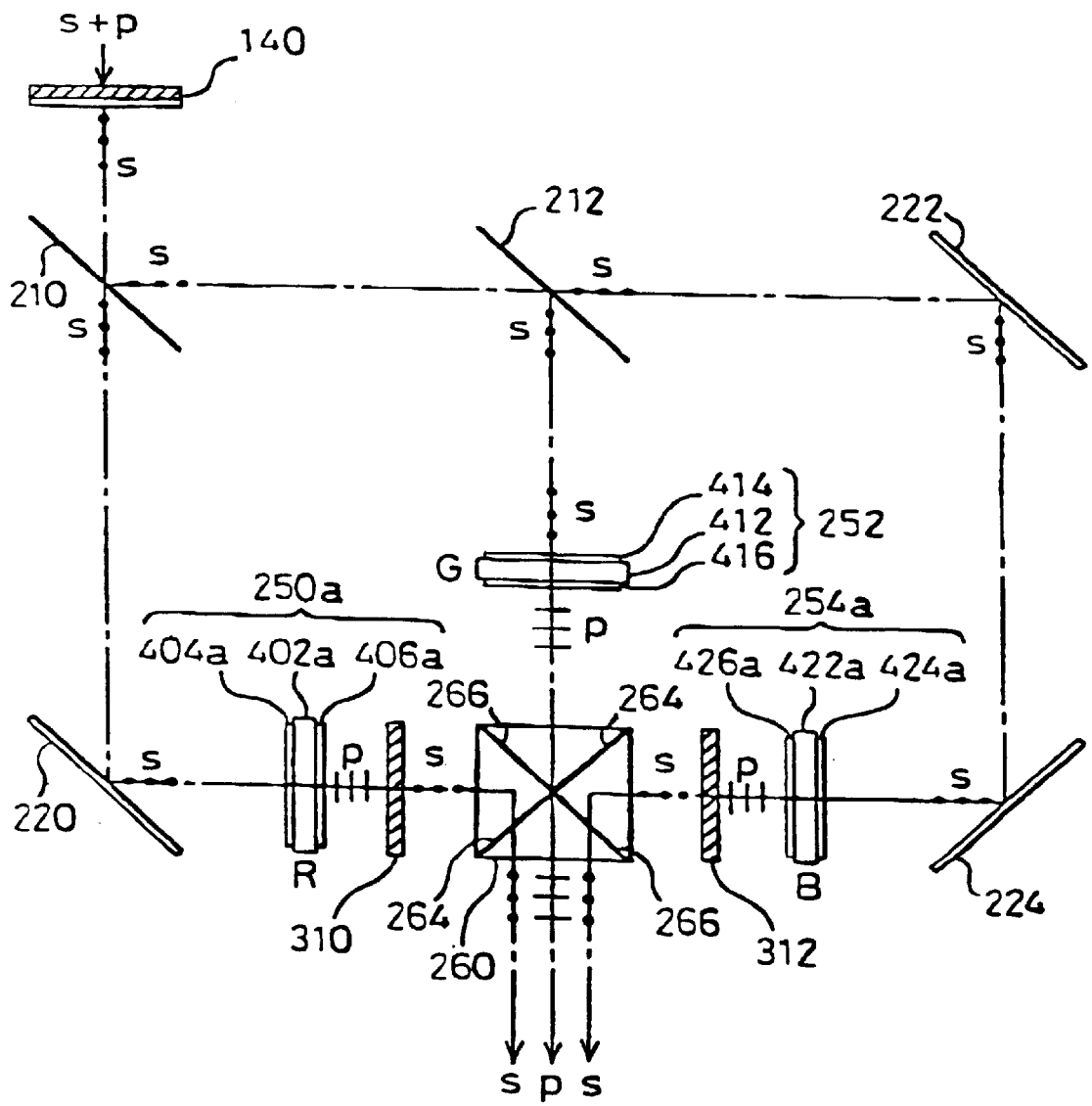
FIG. 8 is a conceptual view showing the principal parts of a second embodiment.

FIG. 8 is a conceptual view showing the principal parts of a second embodiment. In the second embodiment, the two $\lambda/2$ phase plates 310 and 312 of the first embodiment shown in FIG. 4 are placed in the optical paths on the emitting sides of the liquid crystal light valves 250 and 254, respectively, provided a first liquid crystal light valve 250a of the second embodiment is provided with an s-polarizing light transmissive polarizer 404a on the incident side and a p-polarizing light transmissive polarizer 406a on the emitting side. Red light that is s-polarized enters the first liquid crystal light valve 250a, and passes without change through the s-polarizing light transmissive polarizer 404a. The red light is modulated and converted into p-polarized light by a liquid crystal panel 402a, and is emitted via the p-polarizing light transmissive polarizer 406a. Therefore, the red light to be emitted from the first liquid crystal light valve 250a of the second embodiment is p-polarized light. This also applies to a third liquid crystal light valve 254a. Other constituents are the same as those in the first embodiment. The p-polarized red and blue light is converted into s-polarized light by the $\lambda/2$ phase plates 310 and 312, respectively, and enters the cross-dichroic prism 260.

In the second embodiment, green light is incident on the cross-dichroic prism 260 as p-polarized light, and red light and blue light are incident thereon as s-polarized light. Accordingly, the projection display device of the second embodiment has the same advantages as those of the first embodiment. In this embodiment, as distinct from the first embodiment, polarized light of the same type (s-polarized light) is incident on all the liquid crystal light valves 250a, 252, and 254a. Therefore, all the polarizers 404a, 414, and 424a on the incident sides of the liquid crystal light valves 250a, 252, and 254a are provided for s-polarized light, all the polarizers 406a, 416, and 426a on the emitting sides are provided for p-polarized light, and the liquid crystal alignment is the same. Accordingly, the second embodiment has the advantage of being able to reduce the number of types of components by giving a common structure to the three liquid crystal light valves 250a, 252, and 254a, as well as the same advantages as those of the first embodiment.

C. THIRD EMBODIMENT

Figure 9:
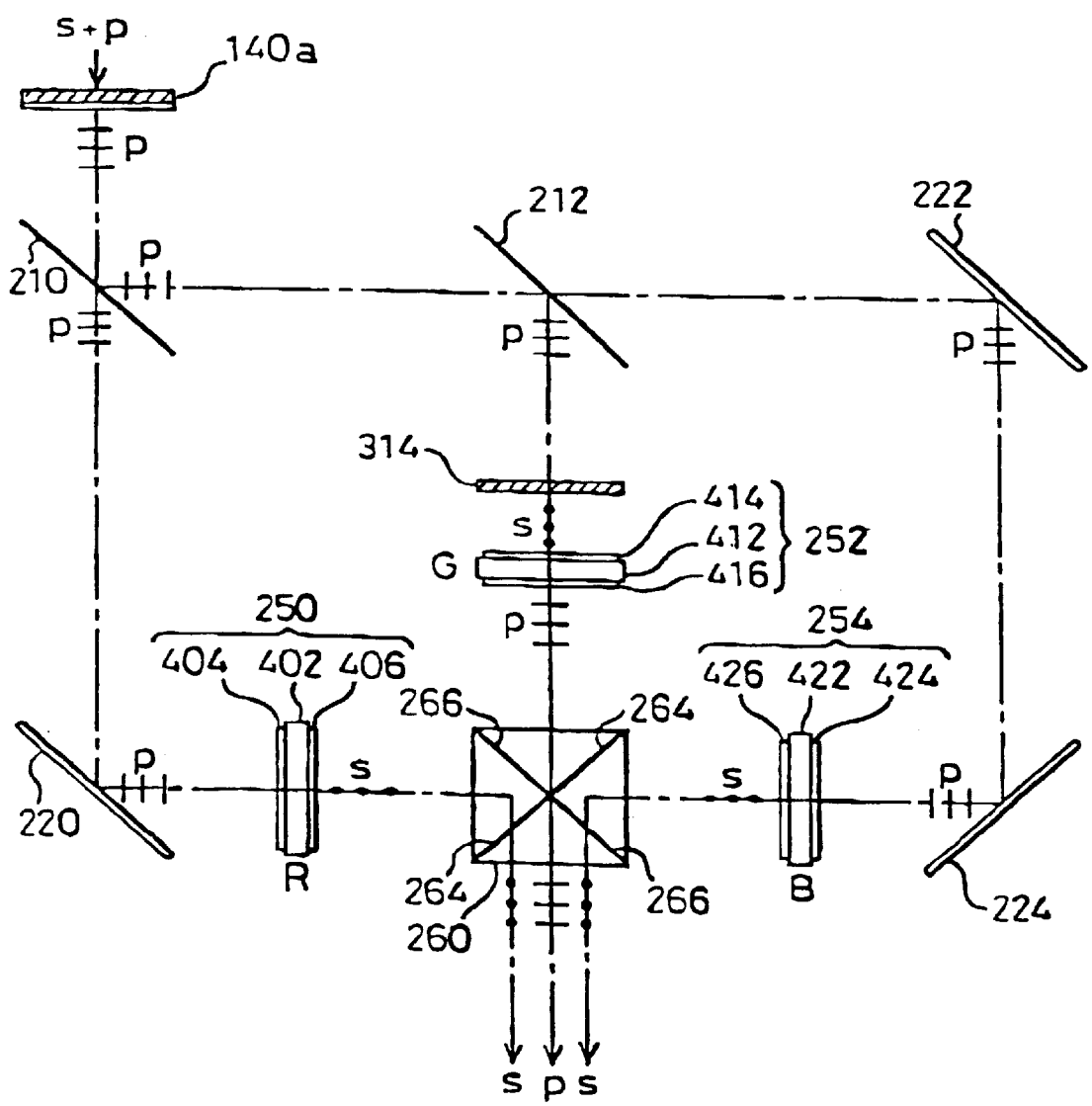
FIG. 9 is a conceptual view showing the principal parts of a third embodiment.

FIG. 9 is a conceptual view showing the principal parts of a third embodiment. In the third embodiment, the polarizing conversion element 140 of the first embodiment shown in FIG. 4 is replaced with a polarizing conversion element 140a for emitting p-polarized light, and a $\lambda/2$ phase plate 314 is placed in the optical path on the incident side of the second liquid crystal light valve 252 instead of the two $\lambda/2$ phase plates 310 and 312. Other constituents are the same as those in the first embodiment.

In the third embodiment, green light is also incident on the cross-dichroic prism 260 as p-polarized light, and red light and blue light are incident thereon as s-polarized light. Therefore, the projection display device of the third embodiment has the same advantages as those of the first embodiment. Furthermore, this embodiment has the advantage of being able to reduce the number of components, compared with the first embodiment, because only the single $\lambda/2$ phase plate 314 is required to be placed in the optical path.

D. FOURTH EMBODIMENT

Figure 10:
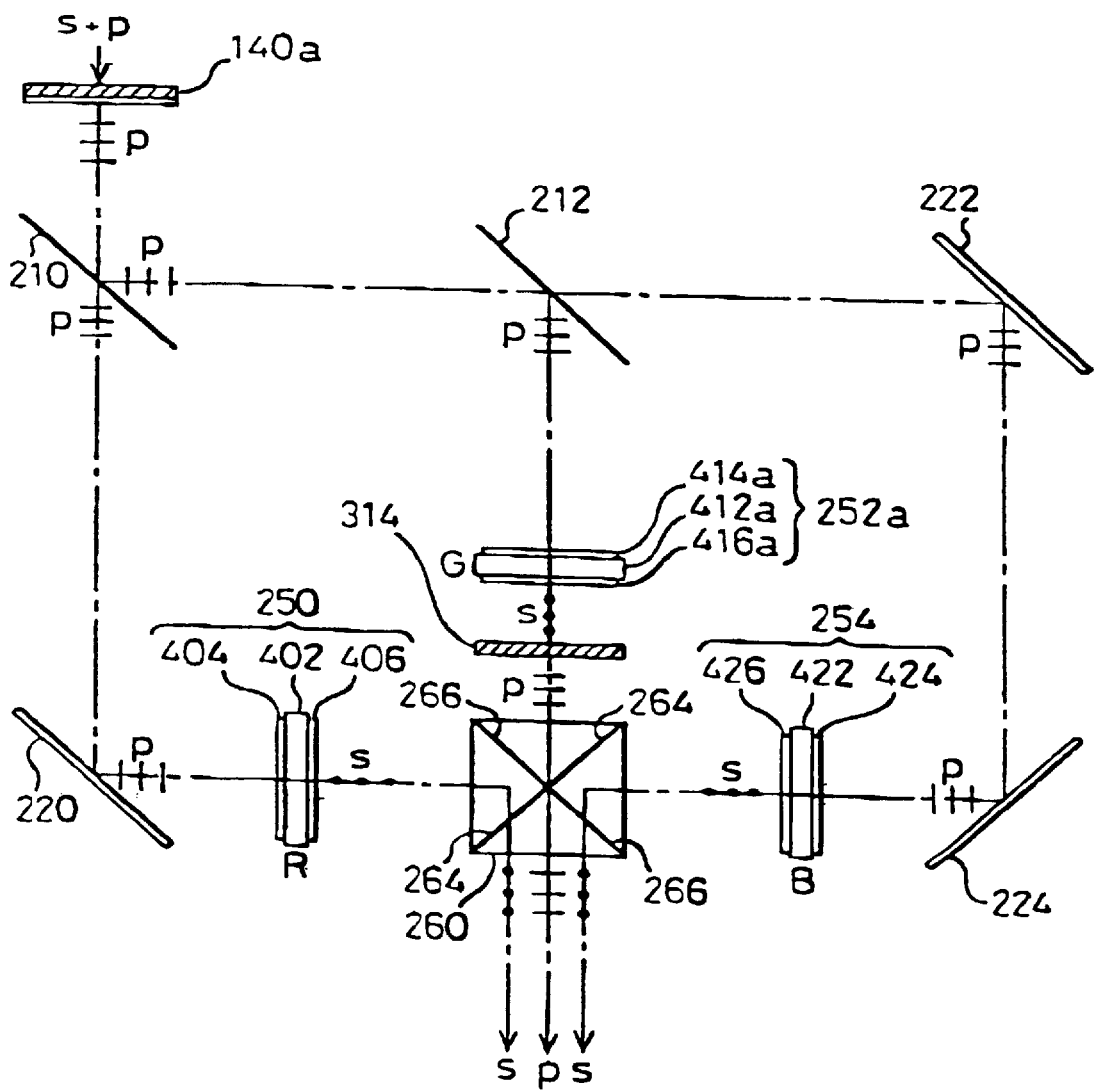
FIG. 10 is a conceptual view showing the principal parts of a fourth embodiment.

FIG. 10 is a conceptual view showing the principal parts of a fourth embodiment. In the fourth embodiment, the $\lambda/2$ phase plate 314 of the third embodiment shown in FIG. 8 is placed in the optical path on the emitting side of the second liquid crystal light valve 252, provided a second liquid crystal light valve 252a of the fourth embodiment is provided with a p-polarizing light transmissive polarizer 414a on the incident side and an s-polarizing light transmissive polarizer 416a on the emitting side. Green light that is p-polarized enters the second liquid crystal light valve 252a, and passes without change through the p-polarizing light transmissive polarizer 414a. The green light is modulated and converted into s-polarized light by a liquid crystal panel 412a, and emitted through the s-polarizing light transmissive polarizer 416a. Consequently, the green light to be emitted from the second liquid crystal light valve 252a of the fourth embodiment is s-polarized light. Other constituents are the same as those in the third embodiment. The s-polarized green light is converted into p-polarized light by the λ/2 phase plate 314, and is incident on the cross-dichroic prism 260.

In the fourth embodiment, green light is also incident on the cross-dichroic prism 260 as p-polarized light, and red light and blue light are incident thereon as s-polarized light. Therefore, the projection display device of the fourth embodiment has the same advantages as those of the first embodiment. Moreover, as distinct from the first embodiment, polarized light of the same type (p-polarized light) is incident on all the liquid crystal light valves 250, 252a, and 254 in this embodiment. Therefore, all the polarizers 404, 414a, and 424 on the incident sides of the liquid crystal light valves 250, 252a, and 254 are provided for p-polarized light, all the polarizers 406, 416a, and 426 on the emitting sides are provided for s-polarized light, and the liquid crystal alignment is the same. Accordingly, the second embodiment has the advantage of being able to reduce the number of types of components by giving a common structure to the three liquid crystal light valves 250, 252a, and 254, as well as the same advantages as those of the first embodiment. Furthermore, since only the single λ/2 phase plate 314 is required to be placed in the optical path in this embodiment, it is possible to reduce the number of components, compared with the first embodiment.

E. FIFTH EMBODIMENT

Figure 11:
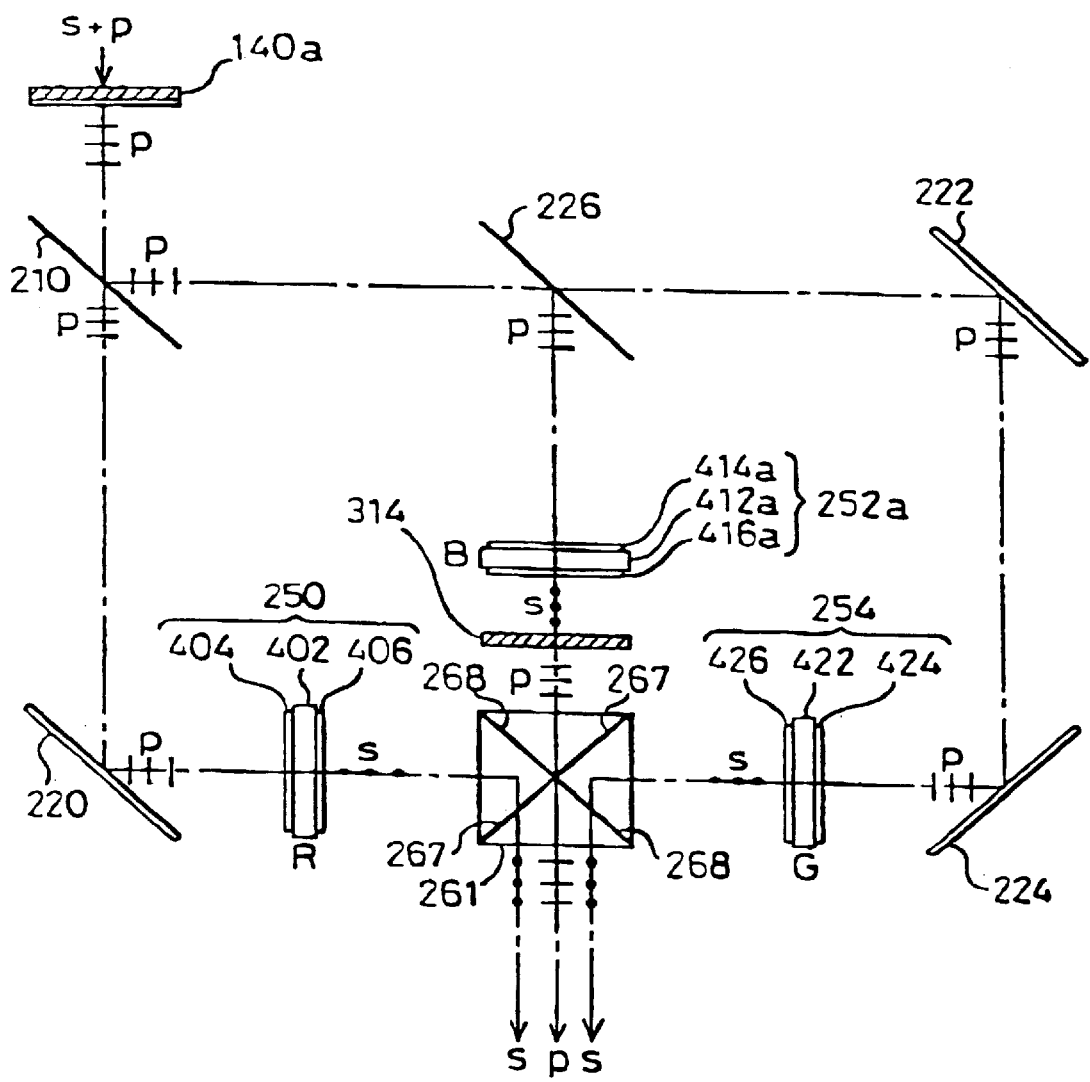
FIG. 11 is a conceptual view showing the principal parts of a fifth embodiment.

FIG. 11 is a conceptual view showing the principal parts of a fifth embodiment. In the fifth embodiment, the optical paths of blue light and green light of the fourth embodiment shown in FIG. 10 are interchanged. That is, a blue reflecting dichroic mirror 226 is employed as the second color separation mirror. Green light and red light are incident on a cross-dichroic prism 261 as s-polarized light, and are reflected by a green reflecting film 267 and a red reflecting film 266, respectively. Blue light is incident on the cross-dichroic prism 261 as p-polarized light and passes therethrough without change.

As mentioned above, the wavelength range of green light that is incident on the liquid crystal light valve 254 for modulating green light, that is, the shade of green is determined by the selective wavelength range of the blue reflecting dichroic mirror 226 serving as the color separation means. Therefore, only light having a wavelength in the predetermined wavelength range selected by the blue reflecting dichroic mirror 226 is incident on the green reflecting film 267 in the cross-dichroic prism 261. Consequently, even if the reflection band of the green reflecting film 267 with respect to green light, which is incident as s-polarized light, is set considerably wider than the predetermined wavelength band selected by the dichroic mirror 226, the shade of green does not change, and conveniently, the light loss can be reduced.

Figure 12:
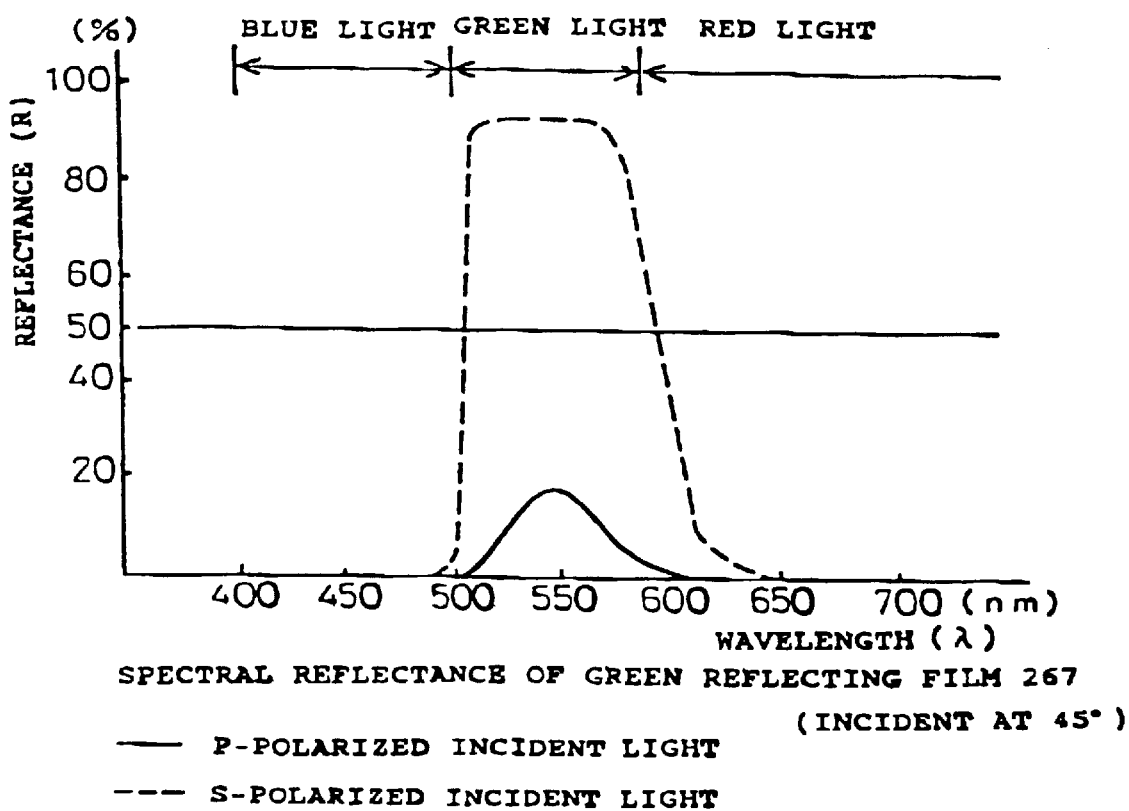
FIG. 12 is a graph showing the spectral reflectance characteristics of a green reflecting film in the fifth embodiment.

FIG. 12 is a graph showing the spectral reflectance characteristic of the green reflecting film 267 employed in this embodiment. As this graph shows, the reflection band of the green reflecting film 267 employed in this embodiment with respect to s-polarized light is set considerably wider than the wavelength band (normally 500 nm to 580 nm) of light to be selectively transmitted by the blue reflecting dichroic mirror 226. As mentioned with reference to FIGS. 5 and 6, however, even if the reflection band of the green reflecting film 267 with respect to s-polarized light is set wider than the wavelength band of light to be selectively transmitted by the blue reflecting dichroic mirror 226, since blue light is incident as p-polarized light, the amount of the blue light to be transmitted does not decrease. This is because the green reflecting film 267 transmits most blue light with the wavelength band (normally 400 nm to 500 nnm) that is incident as p-polarized light, as shown in a graph representing the p-polarized incident light shown by a solid line in FIG. 12.

As the red reflecting film 266, the reflecting film having the characteristic shown in FIG. 5 may be used without change. In this case, the light loss can be also reduced by setting the reflection band of the red reflecting film with respect to red light, which is incident as s-polarized light, considerably wider than the predetermined wavelength band to be selected by the dichroic mirror 210 as shown in FIG. 5, in a similar manner to the green reflecting film 267.

As described in the fourth and fifth embodiments, the cross-dichroic prism in the present invention is required only to have two reflecting films for reflecting light of two of the three colors and to transmit the light of the other color without change. The fifth embodiment, in which blue light passes without change through the cross-dichroic prism 261, has the following advantage. Generally, colored light passing without change through the cross-dichroic prism produces a relatively small amount of reflected light that is reflected from the cross-dichroic prism to the liquid crystal light valve, and contrarily, colored light reflected by the cross-dichroic prism produces a relatively large amount of reflected light reflected from the cross-dichroic prism to the liquid crystal light valve. When blue light passes without change through the cross-dichroic prism and green light is reflected therefrom as in the fifth embodiment, a little blue reflected light and much green reflected light are produced. When a high-pressure discharge lamp, such as a metal halide lamp or a mercury lamp, is employed as the light source lamp 112, the amount of green light is large. At this time, according to the configuration of the fifth embodiment, much green reflected light is produced, and therefore, the balance of light intensity among the light of three colors is improved. Furthermore, the aforesaid light leakage of the polysilicon TFT is apt to be caused by reflected light with a short wavelength. Since the amount of reflected light from the blue light having the shortest wavelength is small in the configuration of the fifth embodiment, even when the polysilicon TFT liquid crystal panel is employed, it is possible to decrease the possibility of a malfunction resulting from reflected light from the cross-dichroic prism to the light valve.

F. SIXTH EMBODIMENT

Figure 13:
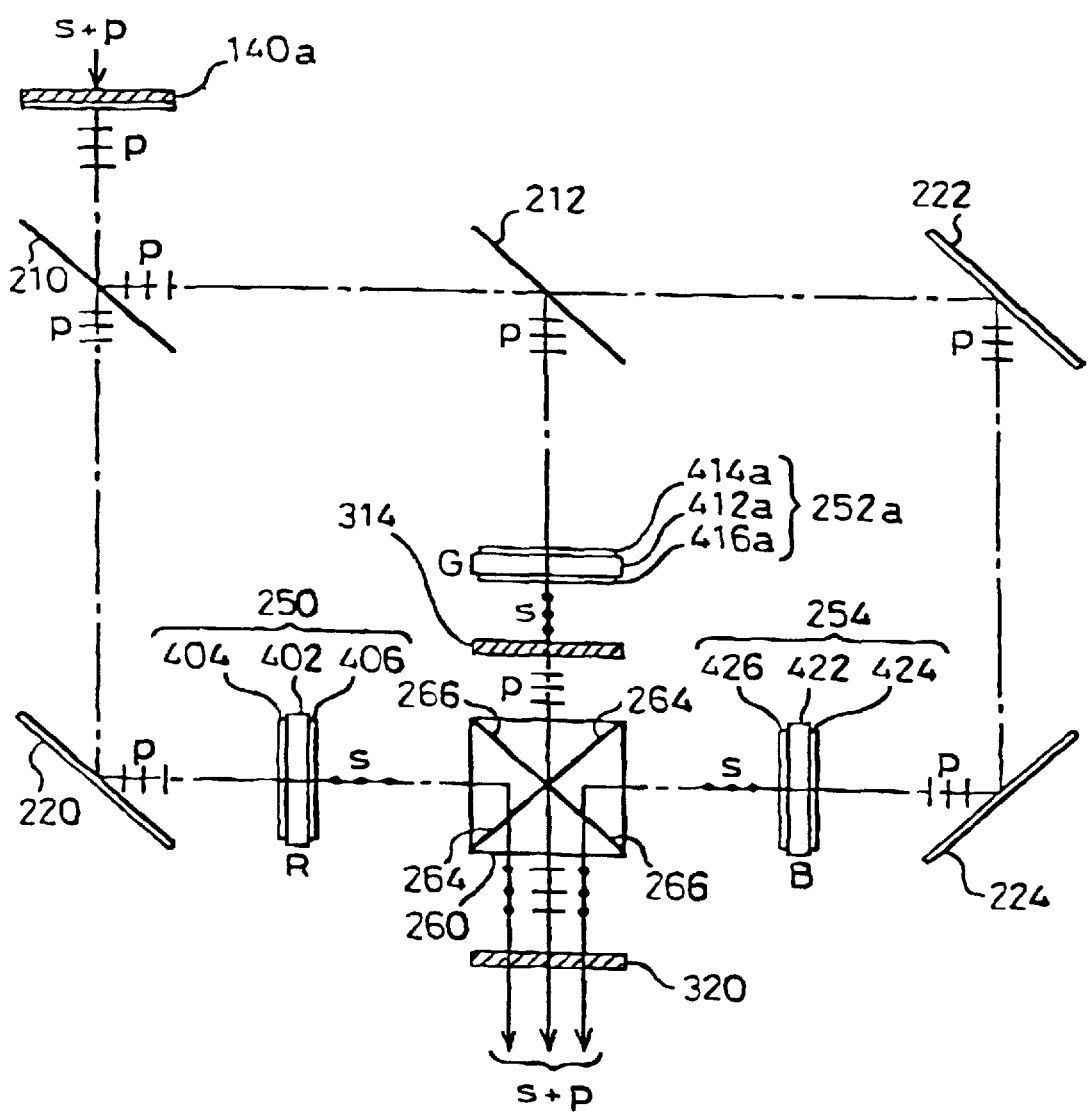
FIG. 13 is a conceptual view showing the principal parts of a sixth embodiment.

FIG. 13 is a conceptual view showing the principal parts of a sixth embodiment. In the sixth embodiment, a phase plate 320 serving as a polarized component adjusting means is added in the optical path on the emitting side of the cross-dichroic prism 260 in the configuration of the fourth embodiment shown in FIG. 9. Although it is preferable that the phase plate 320 be positioned between the cross-dichroic prism 260 and the projection lens system 270, it may be positioned on the emitting side of the projection lens system 270.

A λ/4 phase plate, a λ/2 phase plate or the like may be used as the phase plate 320. When the λ/4 phase plate is used, light of three colors, red, green, and blue can be converted into elliptically polarized light (preferably circularly polarized light). This makes it possible to clearly project a color picture even when a polarizing screen is used as the projection screen 300 (FIG. 1). The polarizing screen is a screen that has the function of reflecting only a polarized component polarized in a predetermined direction (for example, s-polarized light) and preventing the reflection of excess extraneous light so that a picture is easily seen. When all the light of three colors are circularly polarized, a color picture can be clearly projected onto such a polarizing screen.

When the $\lambda/2$ phase plate is used as the phase plate 320, it is preferable to determine the direction of the optical axis of the $\lambda/2$ phase plate so that the polarization directions of s-polarized light (red light and blue light) and p-polarized light (green light) are turned through about 45°. Since s-polarized components and p-polarized components of the light of three colors are in almost equal proportions in this case, it is possible to clearly project a color picture onto the polarizing screen.

G. SEVENTH EMBODIMENT

Figure 14:
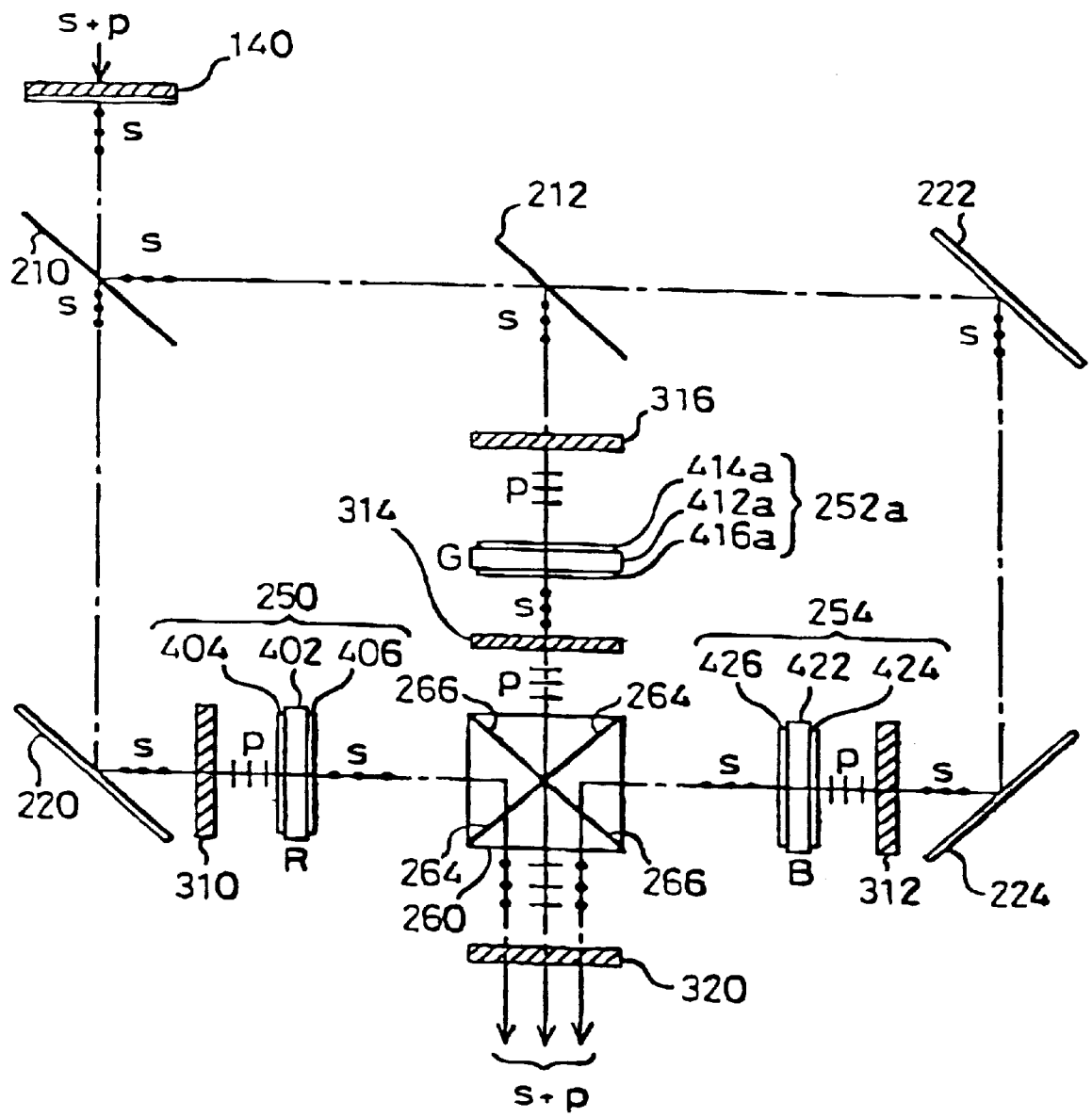
FIG. 14 is a conceptual view showing the principal parts of a seventh embodiment.

FIG. 14 is a conceptual view showing the principal parts of a seventh embodiment. The seventh embodiment is a modification of the second embodiment shown in FIG. 8, in which a $\lambda/2$ phase plate 316 is placed before the liquid crystal light valve 252a, a $\lambda/2$ phase plate 314 is placed behind the liquid crystal light valve 252a, and the liquid crystal light valve 252a is similar to the liquid crystal light valves 250 and 254. Moreover, a $\lambda/2$ phase plate 320 serving as a polarized component adjusting means is placed behind the cross-dichroic prism 260.

This embodiment shows an example in which all the liquid crystal light valves can be of the same type, and has almost the same performance as that of the second embodiment. While the second embodiment adopts liquid crystal light valves on which s-polarized light is incident, this embodiment adopts liquid crystal light valves on which p-polarized light is incident.

The $\lambda/2$ phase plate 320 placed behind the cross-dichroic prism 260 aims to provide the same advantages as those of the sixth embodiment.

H. EIGHTH EMBODIMENT

Figure 15:
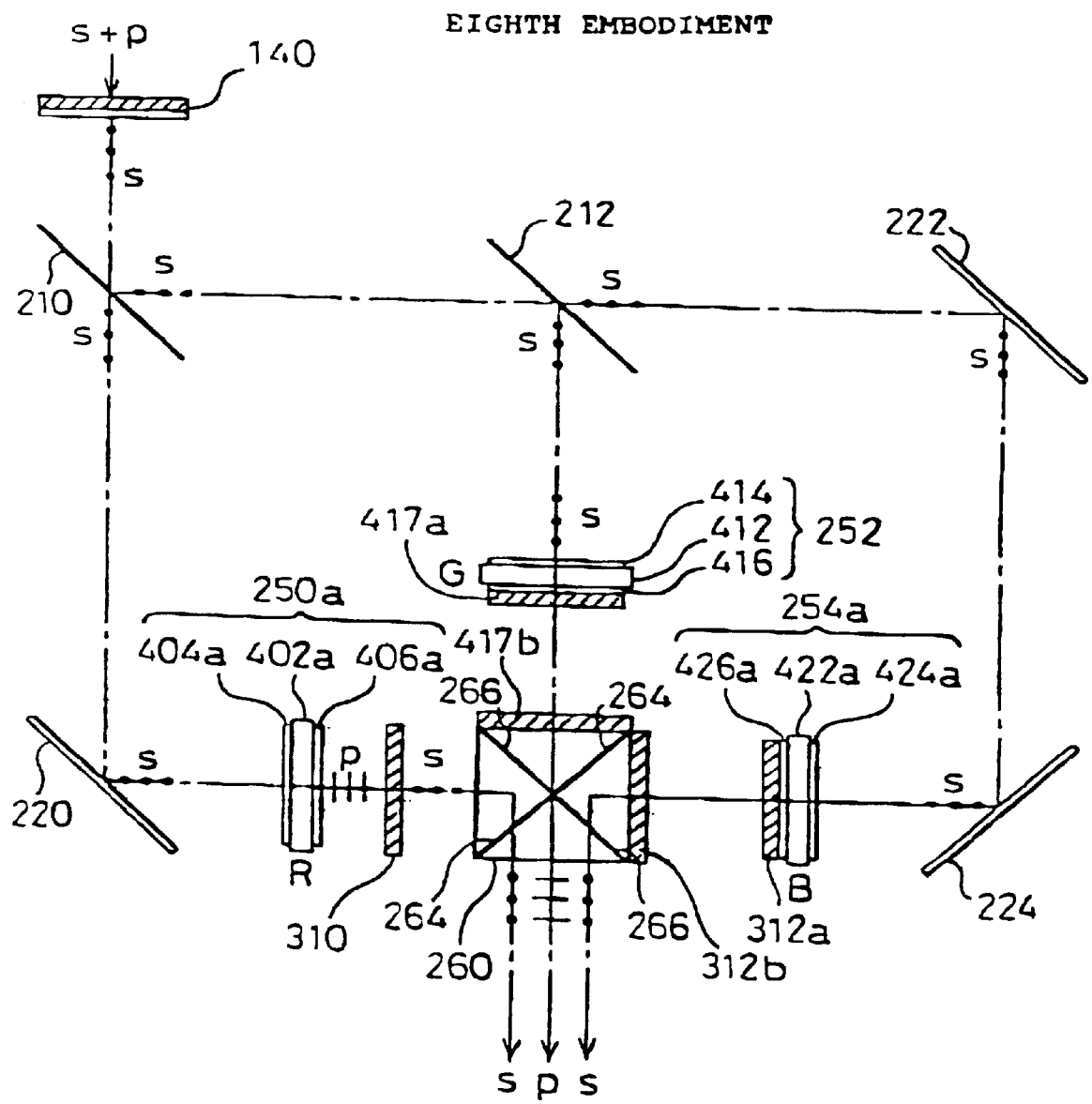
FIG. 15 is a conceptual view showing the principal parts of an eighth embodiment.
Figure 16:
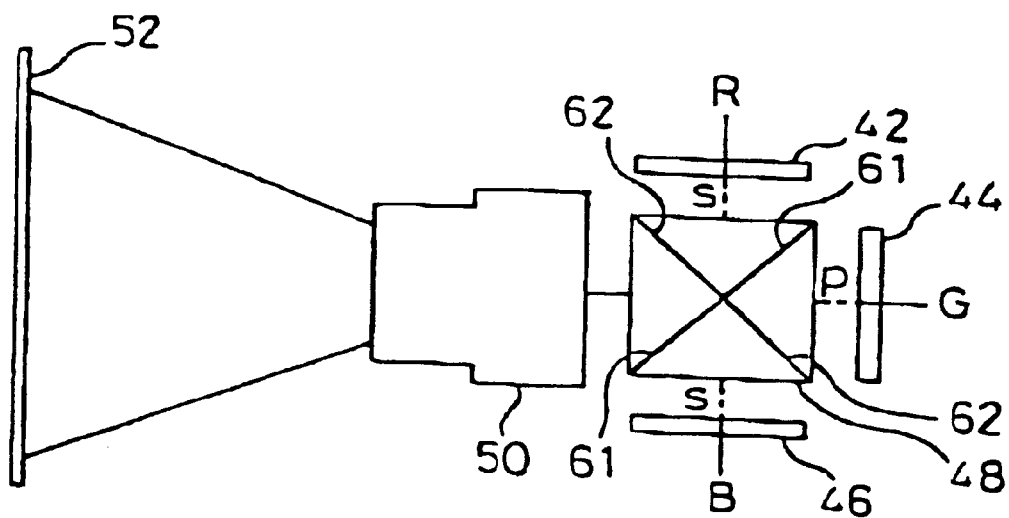
FIG. 16 is a conceptual view showing the principal parts of a projection display device.

FIG. 15 is a conceptual view showing the principal parts of an eighth embodiment. The basic configuration of the optical system in this embodiment is the same as that of the second embodiment. In this embodiment, two $\lambda/4$ phase plates 312a and 312b having the same properties constitute a polarization direction adjusting means instead of the $\lambda/2$ phase plate 312 located in the blue optical path. One of the $\lambda/4$ phase plates 312a is fixedly adhered to the polarizer 426a, and the other $\lambda/4$ phase plate 312b is fixedly adhered to the cross-dichroic prism 260. Moreover, the optical axes of the $\lambda/4$ phase plates 312a and 312b are set so that p-polarized light emitted from the polarizer 426a enters the $\lambda/4$ phase plate 312a and is emitted from the $\lambda/4$ phase plate 312b after being converted into s-polarized light. For example, the $\lambda/4$ phase plate 312b is inclined clockwise at an angle of 45° to the polarization axis of p-polarized light.

By adhering the $\lambda/4$ phase plate 312b to the cross-dichroic prism 260, reflected light can be almost prevented from being produced at the interface between the layer of air and the cross-dichroic prism 260. Although there is a fear that some reflected light will be produced on the incident surface of the $\lambda/4$ phase plate 312b, it is absorbed by the polarizer 426a after passing through the $\lambda/4$ phase plate 312a. As a result, it is possible to prevent a malfunction from being caused by the incidence of light on the emitting side of the liquid crystal panel 422a. The $\lambda/4$ phase plate 312a is not always required to be adhered to the polarizer 426a. The reflected light at the interfaces between air and the $\lambda/4$ phase plates is absorbed by the polarizer 426a, which makes it possible to prevent a malfunction resulting from the light incident on the liquid crystal panel 422a.

Two $\lambda/4$ phase plates 417a and 417b are located between the polarizer 416 and the cross-dichroic prism 260 in the green optical path. The $\lambda/4$ phase plates 417a and 417b are respectively adhered to the polarizer 416 and the cross-dichroic prism 260. The optical axes of the two $\lambda/4$ phase plates 417a and 417b are required to be set so that the optical axis of the $\lambda/4$ phase plate b is inclined at an angle of 90° to the optical axis of the $\lambda/4$ phase plate 417a. Thereby, light is elliptically polarized only between the two $\lambda/4$ phase plates, and does not change the polarization direction after passing through the $\lambda/4$ phase plates. In particular, when the optical axes of the two $\lambda/4$ phase plates 417a and 417b are set symmetrically at an angle of 45° to the polarization axis of p-polarized light or s-polarized light, the light does not change the polarization direction after passing through the two $\lambda/4$ phase plates, and is circularly polarized only therebetween.

By adhering the $\lambda/4$ phase plate 470b to the cross-dichroic prism 260, reflected light can be almost prevented from being produced at the interface between the layer of air and the cross-dichroic prism 260. Although there is a fear that reflected light will be produced even on the incident surface of the $\lambda/4$ phase plate 417b, it is absorbed by the polarizer 416 after passing through the $\lambda/4$ phase plate 417a. As a result, it is possible to prevent a malfunction from being caused by the incidence of light on the emitting surface of the liquid crystal panel 412. The $\lambda/4$ phase plate is not always required to be adhered to the polarizer 416.

While the two $\lambda/4$ phase plates are located between the liquid crystal light valve and the cross-dichroic prism in the above embodiment, two $\lambda/2$ phase plates may be located instead.

The present invention is not limited to the above embodiments or modes, and may be embodied in several forms within the scope thereof. For example, the following modifications are possible.

(1) While the above embodiments employ the two lens arrays 120 and 130 for splitting light from the light source 110 into a plurality of partial beams, the present invention is also applicable to a projection display device that does not employ such lens arrays.

(2) The configuration shown in FIGS. 11 and 13, that is, the configuration, in which the polarized component adjusting means is placed in the optical path on the emitting side of the cross-dichroic prism 260, is applicable not only to the sixth and seventh embodiments, but to the first to fifth embodiments.

(3) While the present invention is applied to the transmissive projection display device in the above embodiments, it may be applied to a reflective projection display device. The "transmissive" type means that a light valve such as a liquid crystal light valve transmits light, and the "reflective" type means that the light valve transmits light. In the reflective projection display device, the cross-dichroic prism is used as a colored-light separation means for separating white light into light of three colors, red, green, and blue, and is also used as a colored light synthesizing means for synthesizing again and emitting the modulated light of three colors in the same direction. Even when the present invention is applied to the reflective projection display device, it is possible to obtain almost the same advantages as those of the transmissive projection display device.

(4) Projection display devices include a front projection display device that projects an image from the direction of viewing the projection plane, and a rear projection display device that projects an image from the opposite direction of the projection plane viewing direction. The above embodiments may be applied to either of the projection display devices.

I claim:

1. A projector comprising:

a light source;

a polarizing conversion element that converts incident light from said light source into linearly polarized light polarized in a first direction;

a colored-light separator that separates the light emitted from said polarizing conversion element into light of first, second and third colors;

a first light valve that receives the light of a first color separated by said colored-light separator and modulates the light based on a first image signal;

a second light valve that receives the light of a second color separated by said colored-light separator and modulates the light based on a second image signal;

a third light valve that receives the light of a third color separated by said colored-light separator and modulates the light based on a third image signal;

a color synthesizing optical element having a first reflecting film that reflects the light of a first color and a second reflecting film that reflects the light of a third color, the first and second reflecting films being crossed in substantially the shape of an X, that synthesizes the light of first, second and third colors modulated by said first, second and third light valves;

a projection optical system that projects the light synthesized by said color synthesizing optical element;

a first phase plate located in an optical path between said polarizing conversion element and said first light valve, that converts the light of a first color polarized in the first polarization direction into linearly polarized light polarized in a second polarization direction and causes the converted light to enter said first light valve; and a second phase plate located in the optical path between said polarizing conversion element and said second light valve, that converts the light of a second color polarized in the first polarization direction into linearly polarized light polarized in the second polarization direction and causes the converted light to enter said second light valve, wherein said third light valve receives the linearly polarized light polarized in the first polarization direction as incident light, modulates the incident light based on the third image signal, and thereby emits the incident light as linearly polarized light polarized in the second polarization direction, and wherein said first and second light valves receive the linearly polarized light polarized in the second polarization direction as incident light, modulate the incident light based on the first and second image signals, respectively, and thereby emit the incident light as linearly polarized light polarized in the first direction.

2. The projector according to claim 1, further comprising:

a third phase plate located in an optical path on an emitting side of said color synthesizing optical element, that converts the light of first, second and third colors emitted from said color synthesizing optical element into polarized light containing a linearly polarized component polarized in the first polarization direction and a linearly polarized component polarized in the second polarization direction.

3. The projector according to claim 2, wherein said third phase plate is a $\lambda/2$ phase plate.

4. The projector according to claim 2, wherein said third phase plate is a $\lambda/4$ phase plate.

5. A projector comprising:

a light source;

a polarizing conversion element for converting incident light from said light source into linearly polarized light polarized in a first direction;

a colored-light separator that separates the light emitted from said polarizing conversion element into light of first, second and third colors;

a first light valve that receives the light of a first color separated by said colored-light separator and modulates the light based on a first image signal;

a second light valve that receives the light of a second color separated by said colored-light separator and modulates the light based on a second image signal;

a third light valve that receives the light of a third color separated by said colored-light separator and modulates the light based on a third image signal;

a color synthesizing optical element having a first reflecting film that reflects the light of a first color and a second reflecting film that reflects the light of a third color, the first and second reflecting films being crossed in substantially the shape of an X, that synthesizes the light of three colors modulated by said first, second and third light valves; and a projection optical system that projects the light synthesized by said color synthesizing optical element, wherein said first, second and third light valves receive the linearly polarized light polarized in the first polarization direction as incident light, modulate the incident light based on the first, second and third image signals, respectively, and thereby emit the light as linearly polarized light polarized in a second polarization direction, and a first phase plate converts the linearly polarized light emitted from said first light valve and polarized in the second polarization direction into linearly polarized light polarized in the first polarization direction and causes the converted light to enter said color synthesizing optical element, the first phase plate being located in the optical path between said first light valve and said color synthesizing optical element, and a second phase plate converts the linearly polarized light emitted from said second light valve and polarized in the second polarization direction into linearly polarized light polarized in the first polarization direction and causes the converted light to enter said color synthesizing optical element, the second phase plate located in the optical path between said second light valve and said color synthesizing optical element.

6. The projector according to claim 5, further comprising:

a third phase plate located in an optical path on an emitting side of said color synthesizing optical element, that converts the light of first, second and third colors emitted from said color synthesizing optical element into polarized light containing a linearly polarized component polarized in the first polarization direction and a linearly polarized component polarized in the second polarization direction.

7. The projector according to claim 6, wherein said third phase plate is a $\lambda/2$ phase plate.

8. The projector according to claim 6, wherein said third phase plate is a $\lambda/4$ phase plate.

9. A projector comprising:

a light source;

a polarizing conversion element that converts incident light from said light source into linearly polarized light polarized in a second direction;

a colored-light separator that separates the light emitted from said polarizing conversion element into light of first, second and third colors;

a first light valve that receives the light of a first color separated by said colored-light separator and modulates the light based on a first image signal;

a second light valve that receives the light of a second color separated by said colored-light separator and modulates the light based on a second image signal;

a third light valve that receives the light of a third color separated by said colored-light separator and modulates the light based on a third image signal;

a color synthesizing optical element having a first reflecting film that reflects the light of a first color and a second reflecting film that reflects the light of a third color, the first and second reflecting films being crossed in substantially the shape of an X, that synthesizes the light of three colors modulated by said first, second and third light valves;

a projection optical system that projects the light synthesized by said color synthesizing optical element; and a phase plate located in an optical path between said polarizing conversion element and said second light valve, that converts the light of a second color polarized in the second polarization direction into linearly polarized light polarized in the first polarization direction and causes the converted light to enter said second light valve, wherein said second light valve receives the linearly polarized light polarized in the first polarization direction as incident light, modulates the incident light based on the second image signal, and thereby emits the incident light as linearly polarized light polarized in the second polarization direction, and wherein said first and third light valves receive the linearly polarized light polarized in the second polarization direction as incident light, modulate the incident light based on the first and third image signals, respectively, and thereby emit the incident light as linearly polarized light polarized in the first direction.

10. The projector according to claim 9, further comprising:

a second phase plate located in an optical path on an emitting side of said color synthesizing optical element, that converts the light of first, second and third colors emitted from said color synthesizing optical element into polarized light containing a linearly polarized component polarized in the first polarization direction and a linearly polarized component polarized in the second polarization direction.

11. The projector according to claim 10, wherein said second phase plate is a $\lambda/2$ phase plate.

12. The projector according to claim 10, wherein said second phase plate is a $\lambda/4$ phase plate.

13. A projector comprising:

a light source;

a polarizing conversion element that converts incident light from said light source into linearly polarized light polarized in a second direction;

a colored-light separator for separating the light emitted from said polarizing conversion element into light of first, second and third colors;

a first light valve that receives the light of a first color separated by said colored-light separator and modulates the light based on a first image signal;

a second light valve that receives the light of a second color separated by said colored-light separator and modulates the light based on a second image signal;

a third light valve that receives the light of a third color separated by said colored-light separator and modulates the light based on a third image signal; and a color synthesizing optical element having a first reflecting film that reflects the light of a first color and a second reflecting film that reflects the light of a third color, the first and second reflecting films being crossed in substantially the shape of an X, that synthesizes the light of first, second and third colors modulated by said first, second and third light valves, wherein said first, second and third light valves receive the linearly polarized light polarized in the second polarization direction as incident light, modulate the incident light based on the first, second and third image signals, respectively, and thereby emit the incident light as linearly polarized light polarized in the first direction, a phase plate that converts the light of a first color polarized in a first polarization direction into linearly polarized light polarized in the second polarization direction and causes the converted light to enter said color synthesizing optical element, the phase plate being located in the optical path between said first light valve and said color synthesizing optical element, and the light of the first color polarized in the second polarization direction and the light of the second and third colors polarized in the first polarization direction enter the color synthesizing optical system.

14. The projector according to claim 13, further comprising:

a second phase plate located in an optical path on an emitting side of said color synthesizing optical element, that converts the light of first, second and third colors emitted from said color synthesizing optical element into polarized light containing a linearly polarized component polarized in the first polarization direction and a linearly polarized component polarized in the second polarization direction.

15. The projector according to claim 14, wherein said second phase plate is a $\lambda/2$ phase plate.

16. The projector according to claim 14, wherein said second phase plate is a $\lambda/4$ phase plate.

17. A projector comprising:

a light source;

a polarizing conversion element that converts incident light from said light source into linearly polarized light polarized in a first direction;

a colored-light separator that separates the light emitted from said polarizing conversion element into light of first, second and third colors;

a first light valve that receives the light of a first color separated by said colored-light separator and modulates the light based on a first image signal;

a second light valve that receives the light of a second color separated by said colored-light separator and modulates the light based on a second image signal;

a third light valve that receives the light of a third color separated by said colored-light separator and modulates the light based on a third image signal;

a color synthesizing optical element having a first reflecting film that reflects the light of a first color and a second reflecting film that reflects the light of a third color, the first and second reflecting films being crossed in substantially the shape of an X, that synthesize the light of first, second and third colors modulated by said first, second and third light valves;

a projection optical system that projects the light synthesized by said color synthesizing optical element; and first phase plates, located in optical paths between said polarizing conversion element and said first, second and third light valves, that convert the light of first, second and third colors polarized in the first polarization direction into linearly polarized light polarized in a second polarization direction and cause the converted light to enter said first light valve, wherein said first to third light valves receive the linearly polarized light polarized in the second polarization direction as incident light, modulate the incident light based on the first, second and third image signals, respectively, and thereby emit the incident light as linearly polarized light polarized in the first polarization direction, a second phase plate that emits the linearly polarized light polarized in the first polarization direction as linearly polarized light polarized in the second polarization direction, the second phase plate being located between said second light valve and said color synthesizing optical element, and the light of the first color polarized in the second polarization direction and the light of the second and third colors polarized in the first polarization direction enter the color synthesizing optical system.

18. The projector according to claim 17, further comprising:

a third phase plate located in an optical path on an emitting side of said color synthesizing optical element, that converts the light of first, second and third colors emitted from said color synthesizing optical element into polarized light containing a linearly polarized component polarized in the first polarization direction and a linearly polarized component polarized in the second polarization direction.

19. The projector according to claim 18, wherein said third phase plate is a $\lambda/2$ phase plate.

20. The projector according to claim 18, wherein said third phase plate is a $\lambda/4$ phase plate.

21. A projector comprising:

a light source;

a colored-light separator that separates the light emitted from said light source into light of first, second and third colors;

a first light valve that receives the light of a first color separated by said colored-light separator, modulates the light based on a first image signal, and emits the light as predetermined linearly polarized light;

a second light valve that receives the light of a second color separated by said colored-light separator and modulates the light based on a second image signal, and emits the light as predetermined linearly polarized light;

a third light valve that receives the light of a third color separated by said colored-light separator, modulates the light based on a third image signal, and emits the light as predetermined linearly polarized light;

a color synthesizing optical element having a first reflecting film that reflects the light of a first color and a second reflecting film that reflects the light of a third color, the first and second reflecting films being crossed in substantially the shape of an X, that synthesizes the light of first, second and third colors modulated by said first, second and third light valves and emits the synthesized light in a same direction;

a projection optical system that projects the light synthesized by said color synthesizing optical element; and two phase plates located in an optical path between at least one of said light valves and said color synthesizing optical element and giving equal phase differences to colored light passing therethrough, one of said two phase plates located on a side of said color synthesizing optical element being adhered to an incident surface of said color synthesizing optical element, and another one of said two phase plates located on the side of said at least one of said light valves, and the optical axes of said two phase plates being set so that the polarization direction of the light incident on said phase plate located on the side of said at least one of said light valves and the polarization direction of the light emitted from said phase plate located on the side of said color synthesizing optical element are identical to each other.

22. The projector of claim 21, wherein said two phase plates are $\lambda/4$ phase plates.

23. The projector of claim 21, wherein said two phase plates are $\lambda/2$ phase plates.

* * * * *